(12) United States Patent
Persson et al.

(10) Patent No.: US 7,206,324 B2
(45) Date of Patent: Apr. 17, 2007

(54) QOS TRANSLATOR

(75) Inventors: Fredrik Persson, Spånga (SE); Gabor Fodor, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1125 days.

(21) Appl. No.: 10/138,240

(22) Filed: May 3, 2002

(65) Prior Publication Data

US 2003/0208582 A1    Nov. 6, 2003

(51) Int. Cl.
  *H04J 3/16* (2006.01)
  *H04J 3/22* (2006.01)
(52) U.S. Cl. .................. 370/466; 370/401
(58) Field of Classification Search .......... None
  See application file for complete search history.

(56) References Cited

U.S. PATENT DOCUMENTS

| | | | | |
|---|---|---|---|---|
| 6,661,780 | B2* | 12/2003 | Li | 370/324 |
| 2001/0027490 | A1* | 10/2001 | Fodor et al. | 709/238 |
| 2002/0122432 | A1* | 9/2002 | Chaskar | 370/466 |
| 2002/0126636 | A1* | 9/2002 | Chen | 370/329 |
| 2002/0184510 | A1* | 12/2002 | Shieh | 713/185 |
| 2002/0194362 | A1* | 12/2002 | Rawlins et al. | 709/235 |
| 2003/0008643 | A1* | 1/2003 | Hestir | 455/417 |
| 2003/0053464 | A1* | 3/2003 | Chen et al. | 370/400 |

FOREIGN PATENT DOCUMENTS

| | | |
|---|---|---|
| EP | 1 191 750 A1 | 3/2002 |
| WO | WO 01/56229 A1 | 8/2001 |
| WO | WO 01/91389 A2 | 11/2001 |

OTHER PUBLICATIONS

Standard Search Report, RS 108656; Date Completed Feb. 6, 2003.

* cited by examiner

*Primary Examiner*—Chirag G. Shah
(74) *Attorney, Agent, or Firm*—Roger S. Burleigh

(57) ABSTRACT

When UMTS is part of IP end-to-end communication, there must exist means for UMTS to be able to provide the required Quality of Service (QoS) for applications running over IP. Hence there is a need for a translation function for translation between IP QoS parameters and UMTS QoS attributes. This translation is not trivial because of several reasons. First, the number of QoS parameters in the IP level and the UMTS level are different. Second, definitions of parameters at the two levels are different. Keeping these factors in view, the present invention provides for a method for translation of IP QoS parameters to UMTS QoS attributes, and another method for translation of UMTS QoS attributes to IP QoS parameters. This translation will enable spectrum efficient UMTS bearers to be set up for applications running over IP. This will also make negotiation of services possible between an entity at the IP level and the UMTS network. These methods are placed in both the User Equipment as well as the Gateway of the UMTS network.

40 Claims, 22 Drawing Sheets

| Traffic class | Conversational class<br>Conversational Real Time | Streaming class<br>Streaming Real Time | Interactive class<br>Interactive best effort | Background class<br>Background best effort |
|---|---|---|---|---|
| Fundamental characteristics | - Preserve time relation (variation) between information entities of the stream<br>- Conversational pattern (stringent and low delay) | - Preserve time relation (variation) between information entities of the stream | - Request response pattern<br>- Preserve payload content | - Destination is not expecting the data within a certain time<br>- Preserve payload content |
| Example of the application | voice | streaming video | web browsing | background download of emails |

FIG.4
*Prior Art*

| | |
|---|---|
| Traffic class | The traffic class label contains a lot of information itself |
| Maximum Bit Rate | Used for downlink code reservation, policing and shaping towards external networks |
| Guaranteed bit rate | Used for admission control and resource reservation |
| Delivery order | Used to settle whether PDUs have to be buffered and reordered in order to be in sequence at the output of the system |
| Maximum SDU size | Used for admission control and policing |
| SDU format information | RLC configuration. If information of all possible SDU sizes is given, then RLC can be transparent (In case no ARQ is needed) |
| SDU error ratio | Used for ARQ configuration, error detection and configuration on L1 (CRC) |
| Residual bit error ratio | Choice of channel coding, error detection on L1 |
| Delivery of erroneous SDUs | Is the network allowed to discard packets in case of erroneous checksum |
| Transfer delay | The delay is used to determine whether ARQ shall/can be used or not. Also used for transport format settings |
| Traffic handling priority | For differentiating Interactive service class for scheduling purposes |
| Allocation/ Retention priority | Used for admission control and settlement in case of congestion i.e. who to admit and who to discard |
| Source statistic descriptor | This information that gives the possibility to use statistics at admission control, e.g. speech and DTX |

FIG.5
*Prior Art*

| Traffic class | Conversational class | Streaming class | Interactive class | Background class |
|---|---|---|---|---|
| Maximum bit rate | X | X | X | X |
| Delivery order | X | X | X | X |
| Maximum SDU size | X | X | X | X |
| SDU format information | X | X | | |
| SDU error ratio | X | X | X | X |
| Residual bit error ratio | X | X | X | X |
| Delivery of erroneous SDUs | X | X | X | X |
| Transfer delay | X | X | | |
| Guaranteed bit rate | X | X | | |
| Traffic handling priority | | | X | |
| Allocation/Retention priority | X | X | X | X |
| Source statistics descriptor | X | X | | |

FIG.6
*Prior Art*

Controlled Load parameters in Intserv

| Token rate (r) | long term average rate of transmission of packets |
|---|---|
| Peak rate (p) | maximum rate at which the packets are sent |
| Maximum packet size (M) | largest packet size that conforms to the traffic specification |

MIME parameters (Optional)

| General parameters | media type | The media type field identifies the nature of data encoded by MIME |
|---|---|---|
| | encoding | It represents the format in which the media type has been encoded |
| AMR specific parameters | mode-set | defines the mode that is being used in the transmission |
| | maxptime | payload time which contains the maximum amount of media that can be encapsulated in the given packet, expressed as time in milliseconds |
| | crc | Cyclic Redundancy Check; used for error detection |

Wireless hints (Optional)

| Expected Delay Bound (EDB) | maximum (upper) delay the application expects |
|---|---|
| Bit Error Ratio (BER) | ratio of bit errors in a packet |
| Packet Loss Ratio (PLR) | required (tolerated) packet loss ratio |
| Packet Handling Priority (PHP) | means to differentiate and prioritise different data traffic flows |
| SDU Format Information (SFI) | internal payload format |

FIG.7
*Prior Art*

QOS TRANSLATOR

BACKGROUND

The present invention relates to interworking of Internet Protocol (IP) and Universal Mobile Telecommunications Service (UMTS), and deals more particularly with translation between IP Quality of Service (QoS) parameters and UMTS QoS attributes.

With the advent of third generation radio access technology, conventional norms of mobile telephony will become a thing of the past. Mobile technology will now be able to offer features, such as multimedia and information services, that go far beyond basic telephony. A perpetually expanding consumer market for these services is being created by the widespread growth of the Internet. However, several challenges are anticipated in the event of providing these services. From a market perspective, this would involve merging the installed base of users in both cellular and Internet environments. Technologically speaking, the challenge would be to determine common denominators for cellular solutions on one hand, and efficient Internet access on the other. To successfully meet these challenges, the third-generation wireless systems must be designed to provide a multitude of services, provide considerable flexibility, and provide structured QoS handling and cost-effective access while ensuring coverage with high radio spectrum efficiency.

The Internet has traditionally operated on a "best effort" basis. Best effort service has been adequate for legacy data traffic and applications that can adapt to bandwidth and delay variations. However, in recent years, there has been a growing need for applications that require real-time and other QoS guarantees, to be able to run on the Internet. The advent of high-speed networks and processors has made possible a variety of widely distributed applications. However, the lack of real-time services and guarantees in the Internet domain has limited large-scale deployment of such applications. These applications have end-to-end QoS requirements that can be expressed in terms of their timing, and the precision and accuracy of the services they offer. For example, a typical user of a videoconference application is ultimately interested in the quality of the picture (the end result); however this is in turn an aggregation of the QoS of capturing the video, compressing it, transmitting it over the network, decompressing it, and finally displaying it.

Internet QoS can be expressed as the combination of network imposed delay, jitter, bandwidth and reliability. Delay is the elapsed time for a packet to traverse from a source to a destination. Jitter is the perceived variation in end-to-end delay. Bandwidth is the maximal data transfer rate that can be sustained between the source and the destination. Finally, the transmission is reliable if it delivers all the packets in the correct order, without dropping them or causing bit errors. Reliability is a property of the transmission system and is affected by the average error rate of the medium as well as by routing and switching designs. In the wireline Internet, packet loss is caused mainly by congestion. However, in wireless networks both congestion and the unreliability of media must be considered.

Various drawbacks of Internet QoS as stated above can be taken care of, to some extent, by offering diverse services rather than a single service that is the best effort service offered by the current Internet. Network services, such as Differentiated Services (Diffserv) and Integrated Services (Intserv) have been designed to offer multiple service levels.

Each of the abovementioned QoS provisioning services provides QoS using different paradigms. Diffserv and Intserv are proposed by the Internet Engineering Task Force (IETF), and built on the TCP/IP (Transmission Control Protocol/Internet Protocol) suite. Diffserv is a packet-based priority service deployed in intermediate systems such as routers, and provides Assured and Premium services with differentiated service priorities. Intserv is a flow-based reservation service deployed in both end (e.g., hosts) and intermediate (e.g., routers) systems, and provides Controlled-Load and Guaranteed services to applications like real-time communications.

Each QoS provisioning service serves applications by providing their own custom user interfaces; this includes Application Programming Interfaces (API) and QoS specifications. Diffserv uses the Bandwidth Broker (BB) and its API, and Intserv uses the Resource ReSerVation Protocol (RSVP) and its API (RAPI).

Applications therefore need to cope with the heterogeneity of user interfaces to ensure their QoS. In addition, the QoS requirements vary from application to application. For example, an Internet telephony application requires voice signals to arrive within a tolerated delay variance (jitter); a video player requires a bandwidth guarantee to convey the images smoothly (bandwidth); and a real-time monitor requires a strictly assured delay of communication (delay).

An important issue that arises now is the ease with which an application can interact with the QoS provisioning services. First, a user may not have exact knowledge of the specific service offered by the network, and may not know how to customize a QoS request for its needs. Second, network QoS may be expressed using different service models and bring about inconsistent resource utilization. Third, legacy applications need to be extended or assisted to access and control QoS delivery. Fourth, interworking of QoS control with systems and applications, which are not equipped to handle QoS, becomes especially important when QoS control is only partially available to some network systems. The problem is further magnified when a wireless system happens to be part of an IP end-to-end communication.

Of particular interest is the specific case where the wireless system is UMTS based. A detailed discussion on this case is carried out hereinafter.

FIG. 1 shows an IP network. The diagram shows two users, but could be easily adapted to include many more users without changing the basic functionality of the network.

In FIG. 1, User-A may communicate with User-B over a text-based or voice-based chat. Similarly, User-A may communicate with an application server that could be a video streaming server. The common component in both these accesses is that the users connect to the IP backbone network through local access networks such as a telephone, GSM (Global System for Mobile Communications), GPRS (General Packet Radio Service), or UMTS network. Moreover, this local access network could be different for User-A and User-B. The IP backbone network may have a number of routers to route packets between User-A and User-B, and between User-A and the application server.

As far as the users are concerned, it is the QoS perceived by them that matters. Hence all intermediary networks need to "cooperate" with each other and "understand" each other's QoS levels.

Different applications can access the network through various application programming interfaces (APIs). An API provides the application programmer with a uniform interface to access the underlying system resources. For example, if the IP network is a Diffserv network, an application program may request that all of its IP packets receive "Expedited Forwarding" treatment.

Note that the API may be oblivious to the technologies that are embedded in the various access networks and backbone networks, which in turn may employ their own QoS levels. For example, the user may use an RSVP/Intserv based API, whereas the end-to-end embodiment may include a UMTS access network and a non-RSVP enabled IP network. In such cases, certain mechanisms are required to make sure that QoS is provided end-to-end.

FIG. 2 shows an End-to-End Integrated Service between the hosts. The service is provided using routers and hosts that support the service definition through signalling of the relevant information between the nodes. The hosts use RSVP to request desired quality of services that they want from the network, for a particular application. All the intermediary routers also use RSVP to deliver QoS to every node all along the path, and to establish and maintain state in order to provide the requested service. A RSVP request will in general result in the network reserving resources at all the nodes on the way to the destination.

GPRS and UMTS may form a part of the overall network and play an important role in the end-to-end bearer service for the customers connected to it. Thus, the services provided over the GPRS/UMTS network must be suitable in aspects of control signaling and user plane transport so that it can provide the required end-to-end bearer service. FIG. 3 illustrates this specific case of FIG. 1 where the local access network is a GPRS/UMTS network. The GPRS/UMTS network consists of a set of network elements between the host, referred to as the Mobile Station (MS), and the external packet switching network that the user is connected to. The Serving GPRS Support Node (SGSN) provides mobility management and authentication for the corresponding MS. The Gateway GPRS Support Node (GGSN) acts as a gateway between the UMTS Core Network and external networks.

The bearer must be set all the way from the source to the destination of a QoS Bearer Service to realize clearly defined characteristics and functionality. To enable the provision of a contracted QoS, a bearer service must include all the requisite aspects. The QoS requirements depend on the current UMTS QoS class under consideration.

FIG. 4 illustrates the QoS classes for UMTS. There are four different QoS classes: Conversational class, Streaming class, Interactive class, and Background class. The main distinguishing factor between these QoS classes is their delay sensitivity: Conversational class is meant for delay sensitive traffic, whereas Background class is meant for traffic that is delay insensitive. Conversational and Streaming classes are mainly intended to carry real-time traffic. The main differentiator between them is their respective delay sensitivity. Conversational real-time services, like video telephony, are the most delay sensitive applications and these data streams should be carried in Conversational class.

The Interactive and the Background class are mainly intended to be used by traditional Internet applications like the World Wide Web (WWW), Email, Telnet, File Transfer Protocol (FTP) and News. Due to looser delay requirements, as compared to Conversational and Streaming classes, both provide better error handling by means of channel coding and retransmission. The main difference between Interactive and Background class is that Interactive class is mainly used by interactive applications, e.g. interactive Email or interactive Web browsing, while Background class is meant for background traffic, e.g. background download of Emails or background file downloading. Responsiveness of the interactive applications is ensured by separating interactive and background applications. Traffic in the Interactive class has higher priority in scheduling as compared to Background class traffic, so background applications use transmission resources only when interactive applications do not need them. This is very important in the wireless environment where bandwidth is scarce as compared to wired networks.

FIG. 5 provides an overview of the uses of different UMTS QoS attributes. The exact definitions of these attributes can be found in 3GPP TS 23.107.

In FIG. 6, the UMTS bearer attributes and their relevancy for each bearer traffic class are shown.

FIG. 7 provides an overview of some IP QoS parameters. IP QoS parameters have been divided into three classes: Controlled Load service parameters, MIME specific parameters and 'wireless hints' (proposed to IETF for standardization). MIME specific parameters and 'wireless hints' are considered as optional.

FIG. 8 depicts UMTS bearer service layered architecture. On its way from one Terminal Equipment (TE) to another, the traffic has to pass through different bearer services of the network(s). A TE is connected to the UMTS network by use of a Mobile Terminal (MT). The End-to-End Service on the application level uses the bearer service(s) of the underlying network(s). The End-to-End-Service used by the TE will be realized using a TE/MT Local Bearer Service, a UMTS Bearer Service, and an External Bearer Service. The UMTS Bearer Service is the bearer service that provides the UMTS QoS.

QoS management functions of the UMTS bearer service for the control plane and QoS management functions for end-to-end IP QoS are illustrated in FIG. 9. These are described in detail in 3GPP TS 23.107 and 3GPP TS 23.207.

The system as described above (i.e. UMTS as a part of IP end-to-end communication) will have a large variety of applications. As a result of such large variety of applications that UMTS is going to offer, it is speculated that IP-UMTS traffic will increase tremendously in future. Such applications would include video streaming, video conferencing, and Multimedia Messaging Services. This will create a need for efficient utilization of bandwidth, especially in the UMTS domain, as there is a paucity of bandwidth in the wireless medium. If one is able to translate IP QoS parameters to UMTS QoS attributes, one could easily determine the bandwidth requirement for the particular application, thereby resulting in efficient spectrum utilization.

Furthermore, applications will also be required to negotiate the services at different levels (e.g. kind of application and received QoS), for which translation between IP QoS parameters and UMTS QoS attributes seems to be an imperative. This translation is likely to result in more efficient service negotiation between an entity at the IP level and the entire UMTS network itself.

Certain patents have been filed in this area. International Patent Application No. WO 01/56250, titled "RSVP handling in 3G networks", deals with providing a method in a mobile terminal to support RSVP signalling in 3G wireless networks. The mobile terminal is connected to local user's terminal equipment and is also in communication with the radio network. To support interworking of RSVP and IP QoS information in the UMTS network, the invention provides a method to include IP QoS information in a Packet Data Protocol (PDP) context, and to carry the QoS information through the UMTS network. However, it does not address the issue of translation of IP QoS parameters to UMTS QoS attributes and vice-versa, which is essential for efficient spectrum utilization in the UMTS domain while dealing with IP traffic. This translation function is also required for service negotiation between an entity at the IP level and the entire UMTS network.

This translation between IP QoS parameters and UMTS QoS attributes is not trivial because of several reasons. First, the number of QoS parameters at the two levels is different, because of which the mapping is not one-to-one. Second, the definitions of parameters at the two levels are different. This is true both for range and the expected usage of the parameters. This is e.g. due to different ways of providing QoS (over-provisioning in the IP networks of today versus spectrum efficient transport in cellular networks). Third, the problem of translating the IP QoS parameter set that includes the Wireless hints (specified in FIG. 7) has not been solved earlier.

Therefore, what is needed is a translation function for translation between IP QoS parameters and UMTS QoS attributes.

SUMMARY

The present invention is directed to a method that satisfies the need for a translation function for translation between IP QoS parameters and UMTS QoS attributes.

An object of the present invention is directed to a method that satisfies the need for a translation function for translation between IP QoS parameters (including the Wireless hints) and UMTS QoS attributes.

Another object of the present invention is to provide for a method in a mobile terminal for translation between IP QoS parameters and UMTS QoS attributes.

Another object of the present invention is to provide a method for translation of IP QoS parameters including the Wireless hints to UMTS QoS attributes.

Another object of the present invention is to provide for a method in a UMTS Gateway for translation between IP QoS parameters and UMTS QoS attributes.

Still another object of the present invention is to provide a method for translation of UMTS QoS attributes to IP QoS parameters including the Wireless hints.

A further object of the present invention is to provide a QoS translation method for efficient utilization of UMTS bearers.

Yet another object of the present invention is to provide a QoS translation method for making negotiation of services possible between an entity at the IP level and the UMTS network.

To achieve the foregoing objects, and in accordance with the purpose of the present invention as broadly described herein, the present invention provides for a method for translation between IP QoS parameters and UMTS QoS attributes.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 4 illustrates UMTS QoS classes and their characteristics;

FIG. 5 provides an overview of UMTS QoS attributes;

FIG. 6 illustrates UMTS QoS attributes and their relevancy for each traffic class;

FIG. 7 provides an overview of some IP QoS parameters;

DESCRIPTION OF PREFERRED EMBODIMENTS

Figure 1:
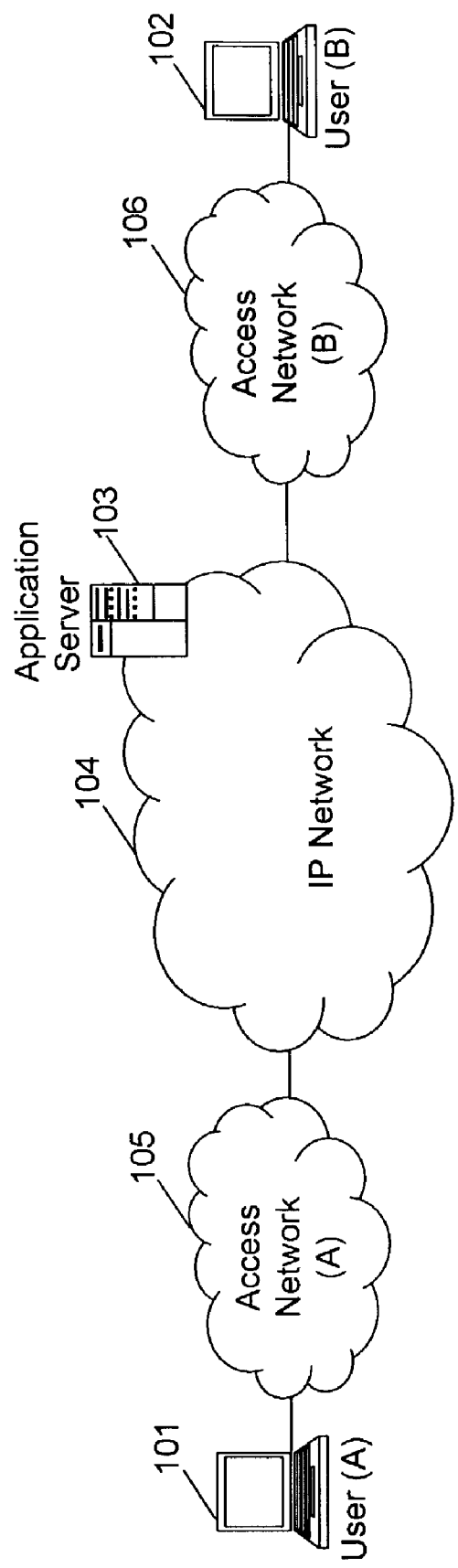
FIG. 1 illustrates a block diagram showing high level IP network.
Figure 2:
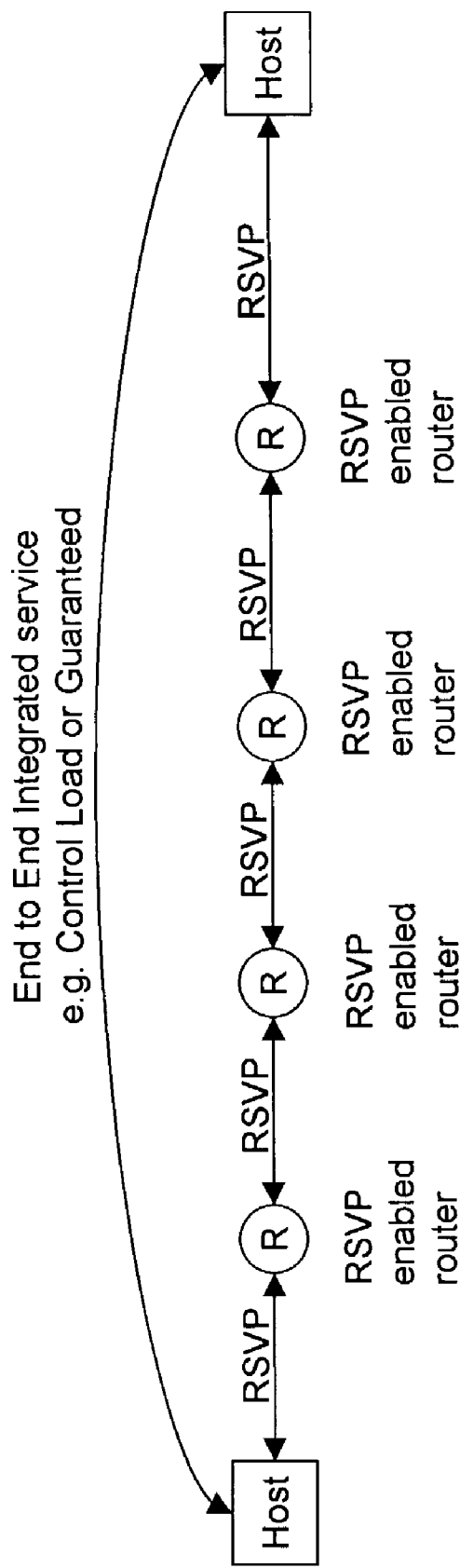
FIG. 2 illustrates a block diagram depicting an example of a network employing end to end integrated services.
Figure 3:
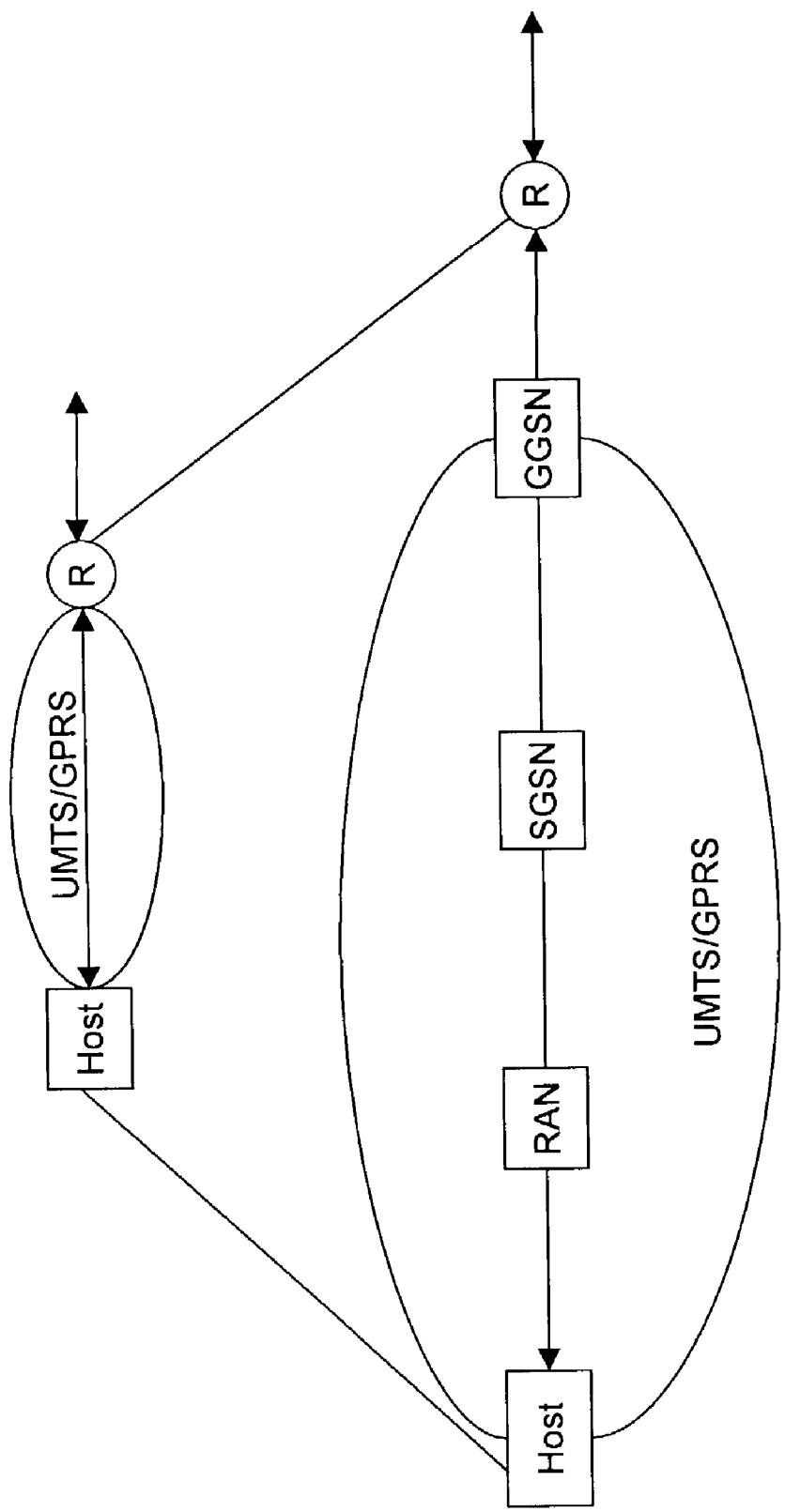
FIG. 3 illustrates a specific case of FIG. 1 where the local access network is a GPRS/UMTS network.
Figure 8:
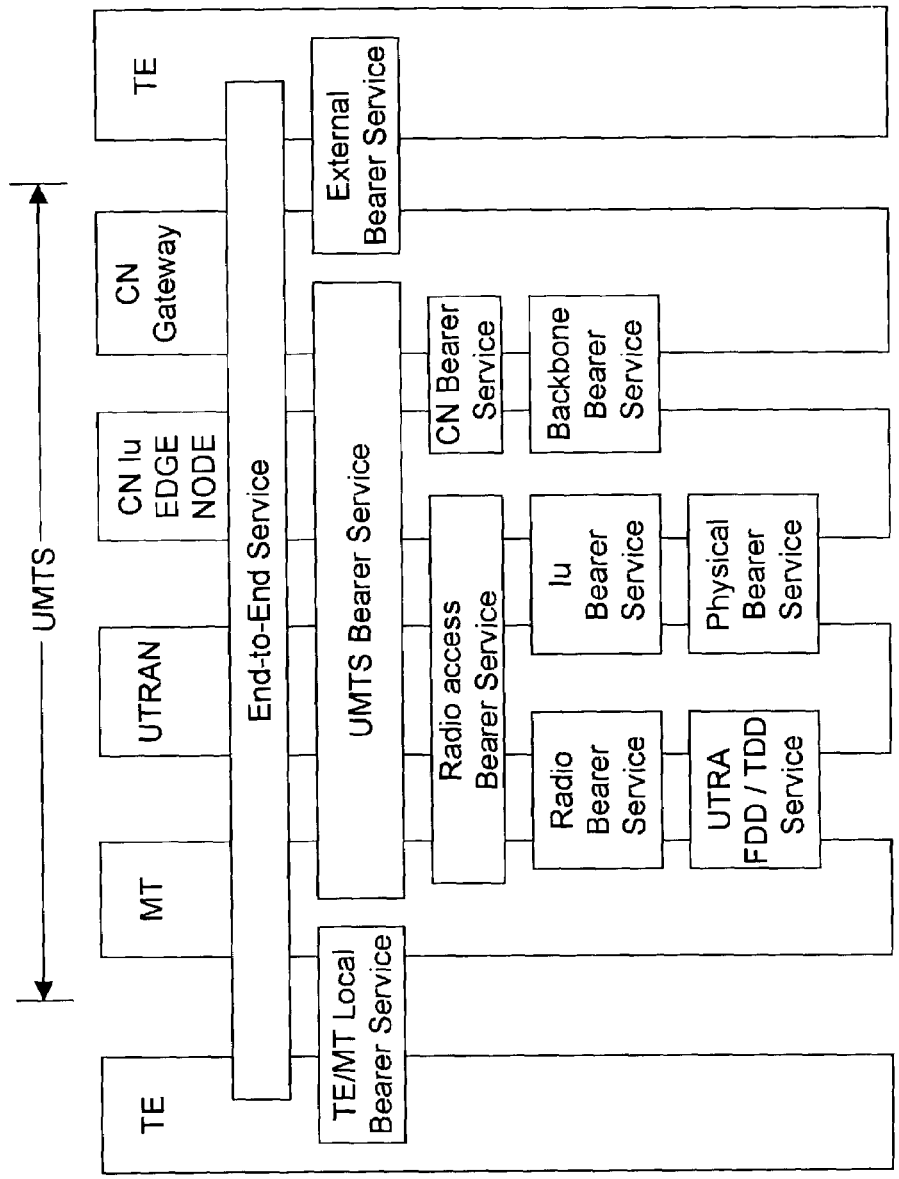
FIG. 8 illustrates a block diagram of UMTS QoS architecture.

FIG. 1 shows an IP network, wherein User-A 101 may communicate either with User-B 102 or with an application server 103. Both users are connected to Internet 104 through local access networks 105 and 106. The present invention is useful in the specific case when a user is connected to the Internet through a local access network, which is a UMTS network. In such a scenario, the necessary UMTS resource parameters must be derived from the QoS parameters specified at the IP layer. For this purpose, an entity called 'Translation function' has been defined within the control plane architecture of UMTS, which is part of the 3GPP standard. One of the tasks of the translation function is to translate between UMTS bearer service attributes and QoS parameters of external network service control protocols. The present invention provides a method in the translation function for translation between IP QoS parameters and UMTS QoS attributes.

Figure 9:
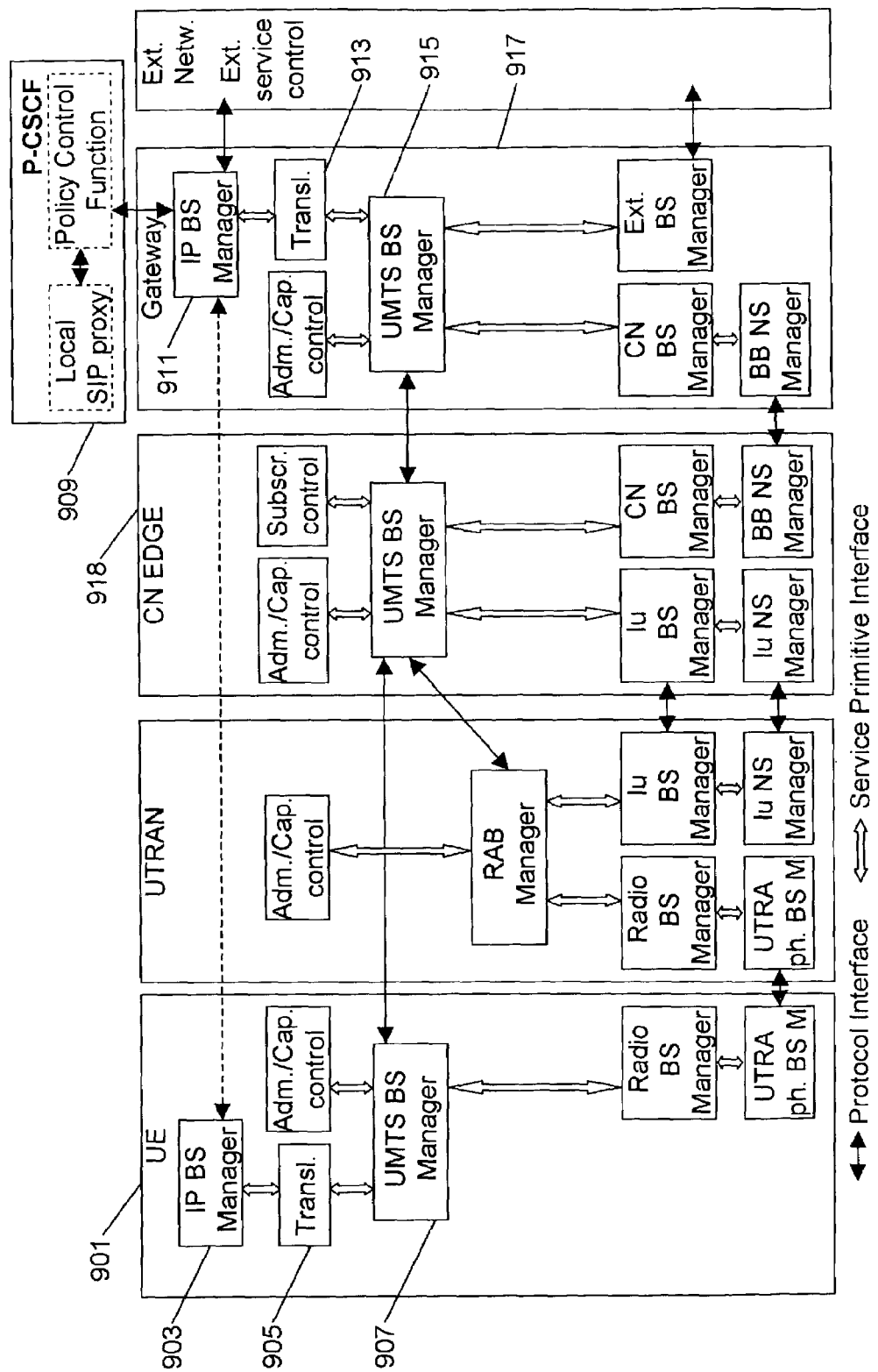
FIG. 9 illustrates a block diagram depicting QoS management functions for UMTS bearer service in control plane and QoS management functions for end-to-end IP QoS.

The translation function 905 or 913 can either be placed in User Equipment (UE) 901 or in Gateway 917. This is illustrated in FIG. 9. In both the cases, the translation function interacts with both IP Bearer Service (BS) Manager 903 or 911 and UMTS BS Manager 907 or 915 to accomplish translation between IP QoS parameters and UMTS QoS attributes. UMTS BS Manager in UE 901, Core Network Enhanced Data for GSM Evolution (CN EDGE) 918 and Gateway 917 signal between each other, and via the translation function with external instances to establish or modify a UMTS bearer service. IP BS Manager uses standard IP mechanisms to manage IP bearer services. The IP BS Manager in the Gateway interacts with Policy Control Function (PCF) 909. PCF is a logical policy decision element which uses standard IP mechanisms to implement policy in the IP bearer layer. The functionalities for TE and MT have been combined into the User Equipment (UE), as 3GPP has not yet standardized the distribution of functionalities between TE and MT.

The translation function in the UE or the Gateway can be implemented either in software or in hardware. In software, this can be a part of the UMTS driver, which may be an installable part of the operating system. Alternatively, in hardware, the translation function can be implemented in a UMTS PCMCIA card or a modem.

Figure 20:
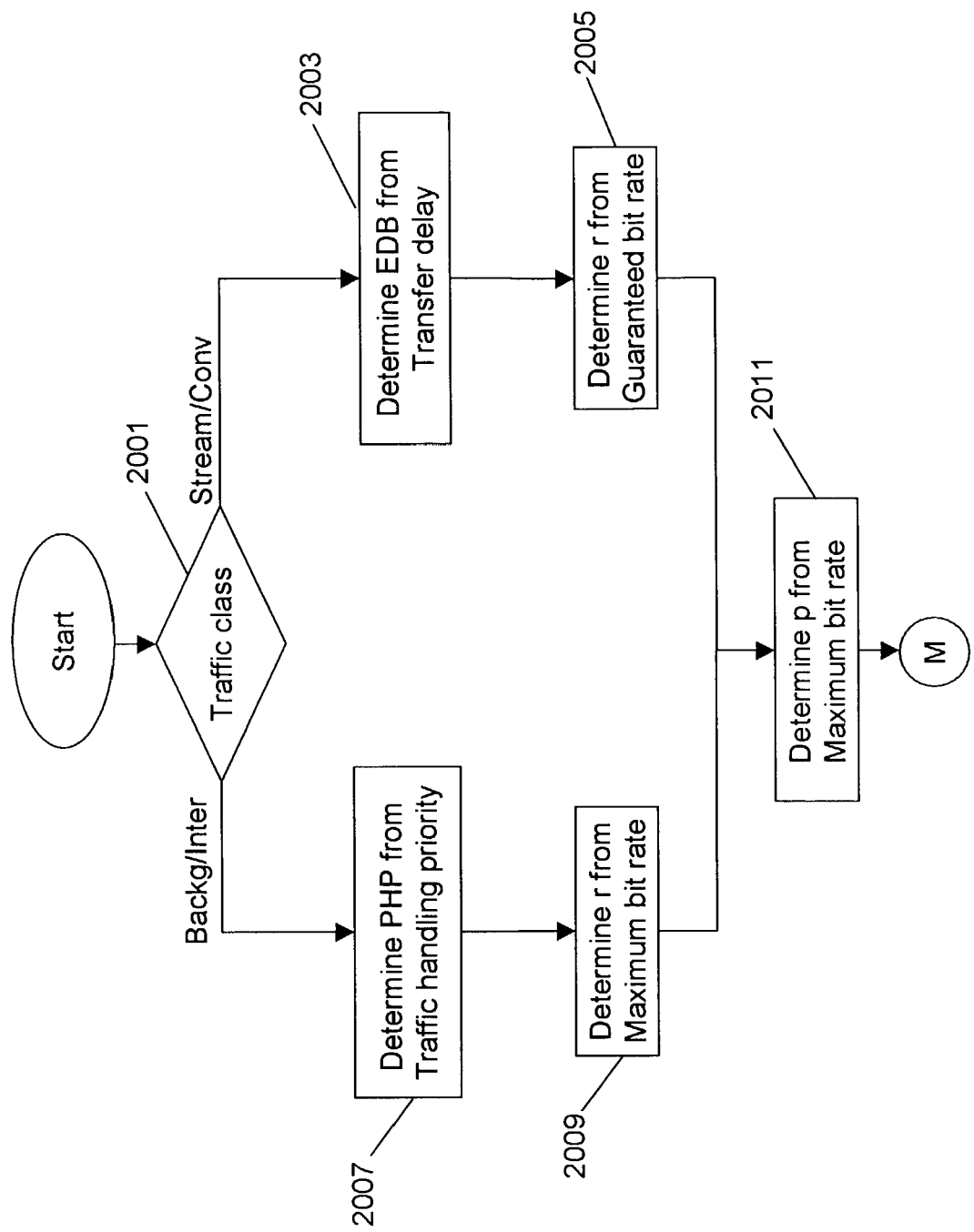
FIGS. 20 through 22 illustrate a flowchart describing translation of UMTS QoS attributes to IP QoS parameters.
Figure 21:
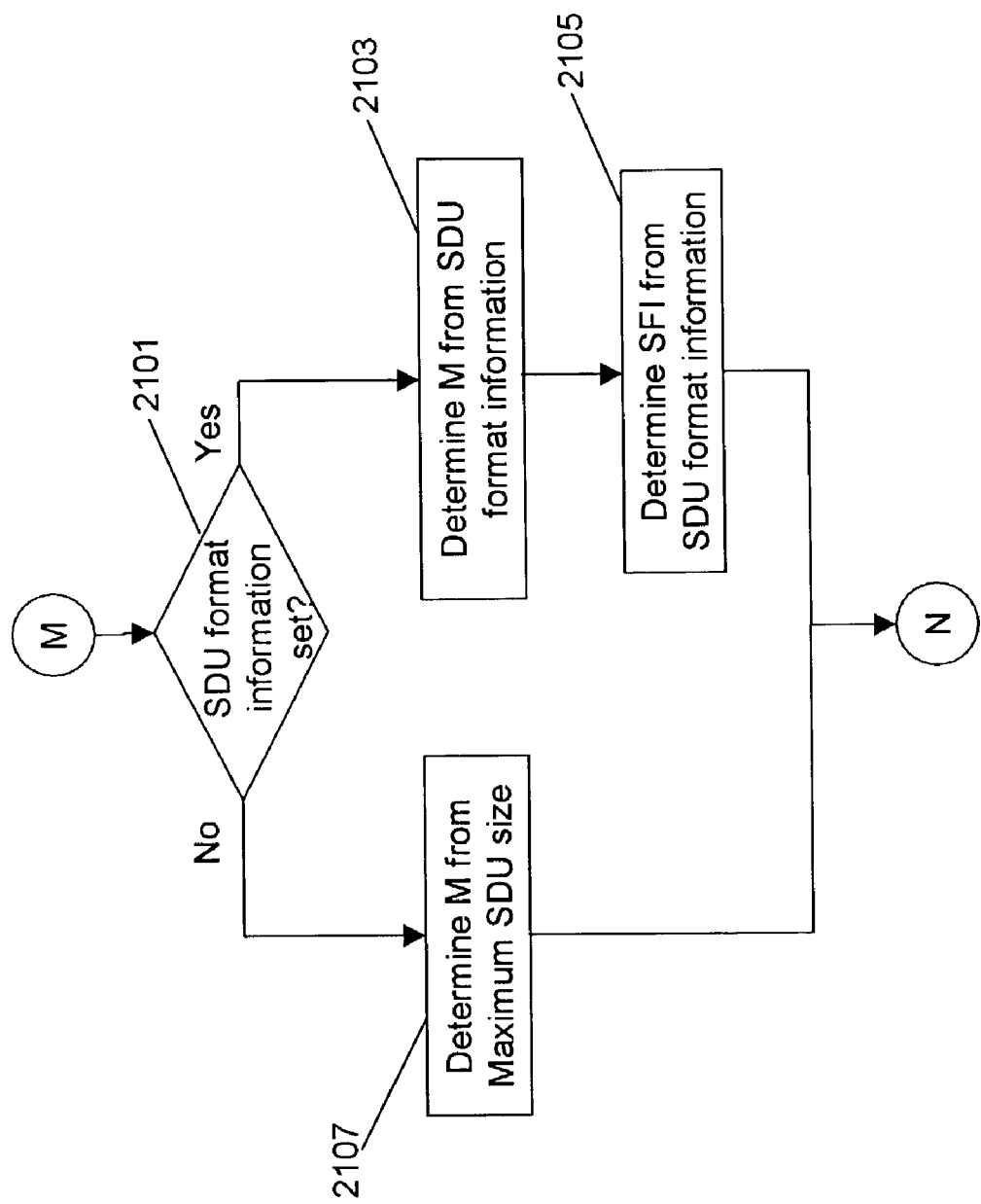
Figure 22:
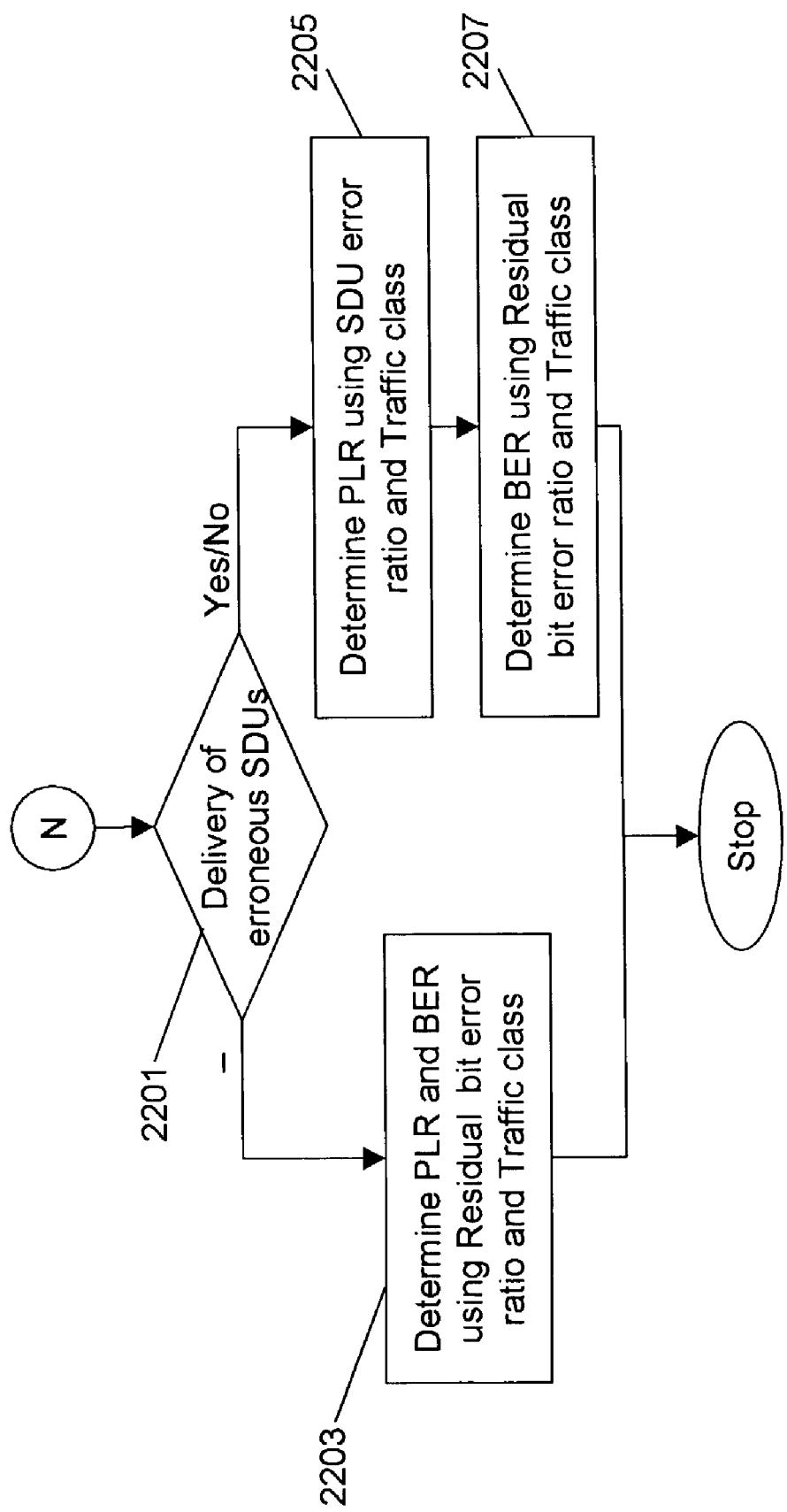

FIGS. 10 through 19 illustrate a flowchart describing translation of IP QoS parameters to UMTS QoS attributes. The translation from UMTS QoS attributes to IP QoS parameters is illustrated in FIGS. 20 through 22.

Figure 10:
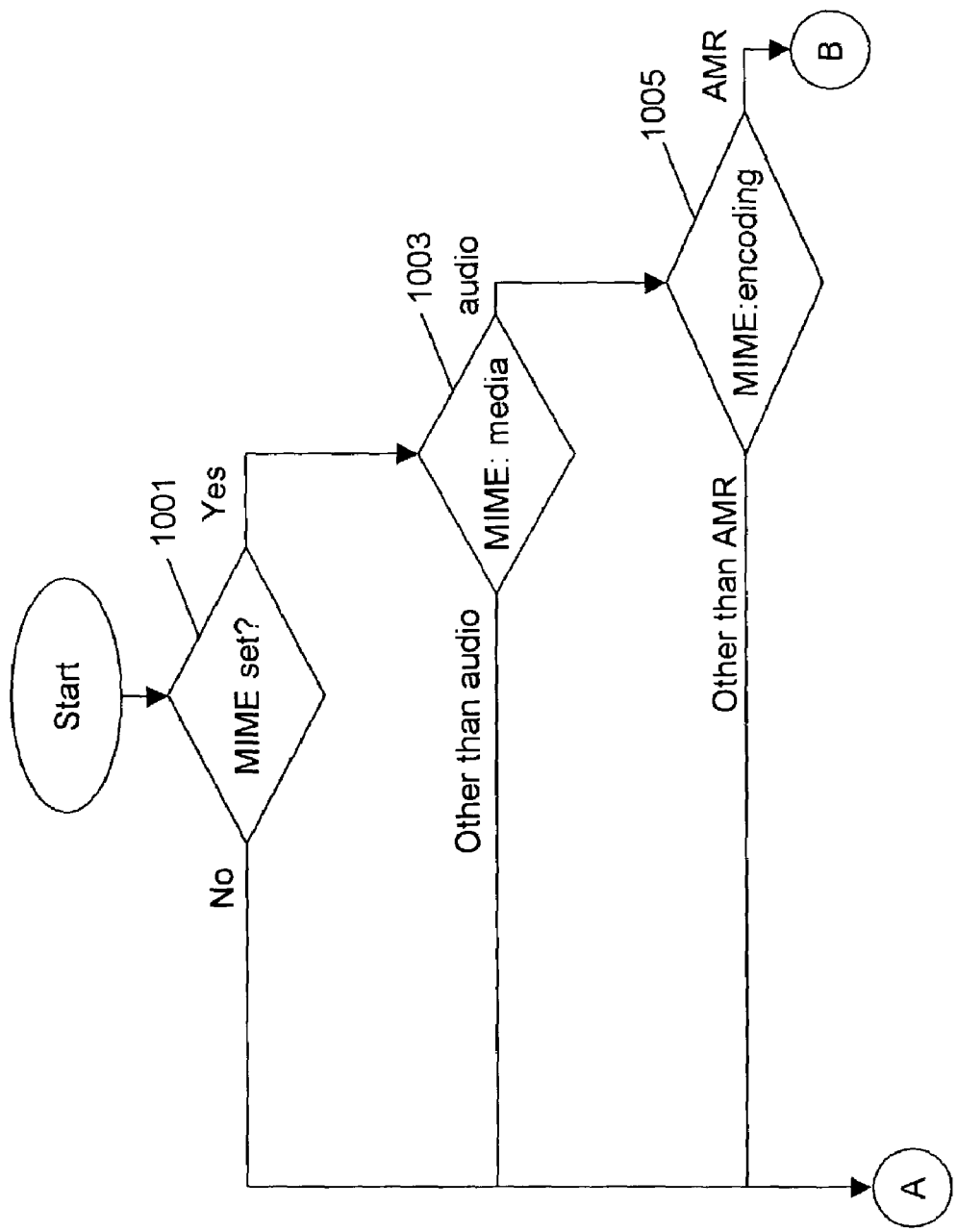
FIGS. 10 through 19 illustrate a flowchart describing translation of IP QoS parameters to UMTS QoS attributes.

Referring now to FIG. 10, the MIME parameters, if set, can be used to enhance the translation. The first step in translating IP QoS parameters to UMTS QoS attributes involves, therefore, checking at step 1001 whether MIME parameters are set. If MIME parameters are not set, the corresponding case is discussed in detail with reference to FIGS. 11 through 16. If MIME parameters are set, MIME media type is checked for at step 1003. If MIME media type is other than audio, the case is discussed with reference to FIGS. 11 through 16. If MIME media type is audio, MIME encoding is checked for at step 1005. If MIME encoding is other than Adaptive Multi Rate (AMR), the case is discussed with reference to FIGS. 11 through 16. If MIME encoding is AMR, the case is discussed with reference to FIGS. 13 through 19.

Figure 11:
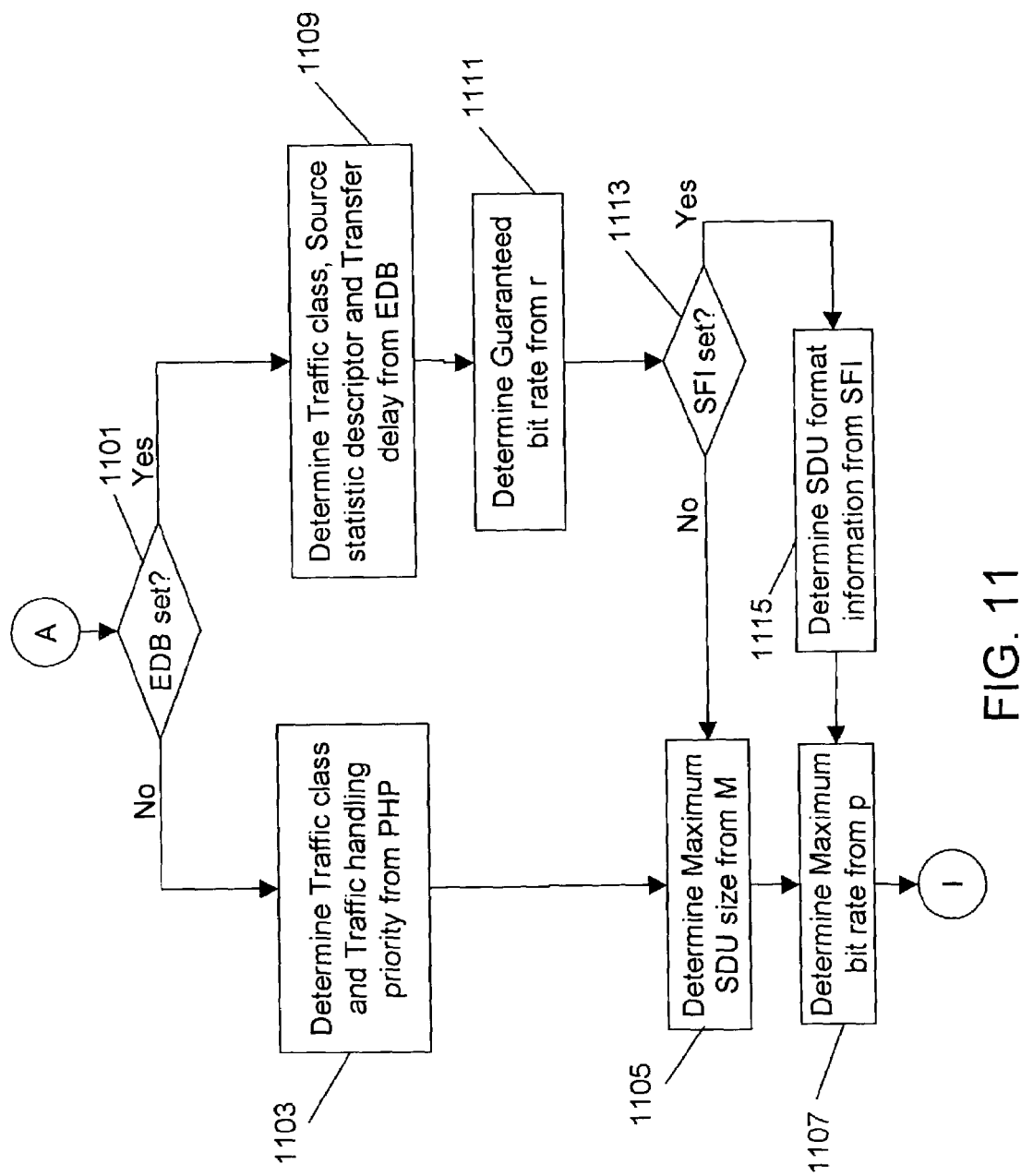

Referring now to FIG. 11, it is first checked whether Expected-Delay-Bound (EDB) is set at step 1101. If EDB is set, values of Traffic-class, Transfer-delay and Source-statistics-descriptor are determined using EDB at step 1109. The value of EDB can be used to differentiate between Conversational class and Streaming class. Further, Guaranteed-bit-rate and Maximum-bit-rate are determined from corresponding IP QoS parameters that are Token-Rate (r) at step 1111 and Peak-Rate (p) at step 1107. If SDU-Format-Information (SFI) is set at step 1113, it is used to determine the corresponding UMTS attribute i.e. SDU-format-information at step 1115. If SFI is not set, one can just determine Maximum-SDU-size from Maximum-Packet-Size (M) at step 1105.

If EDB is not set at step 1101, Packet-Handling-Priority (PHP) is used to determine Traffic-class and Traffic-handling-priority at step 1103. PHP can be used to differentiate between Interactive and Background class. Maximum-SDU-size is determined from Maximum-Packet-Size at step 1105 and Maximum-bit-rate is determined from Peak-Rate at step 1107.

Figure 12:
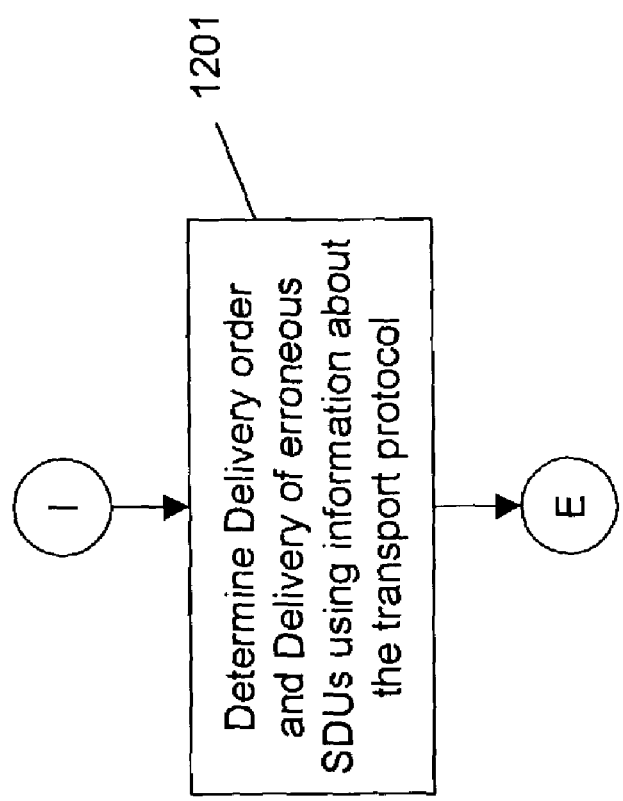

Referring now to FIG. 12, UMTS attributes Delivery-order and Delivery-of-erroneous-SDUs are determined using information about the transport protocol used at step 1201. As an example, UDP-lite could indicate that erroneous SDUs should be delivered, and that in-sequence delivery of SDUs is not required.

Figure 13:
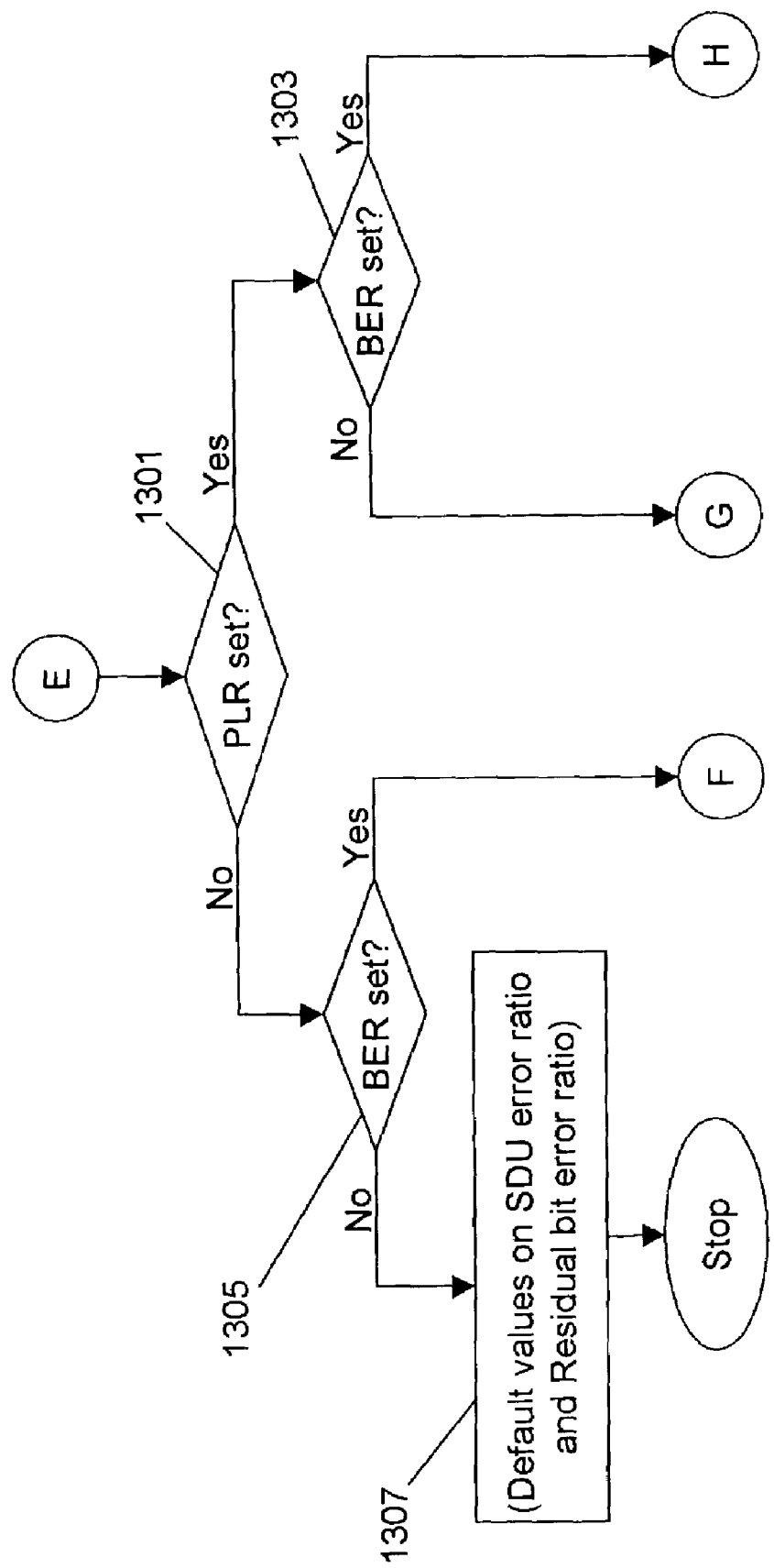
Figure 15:
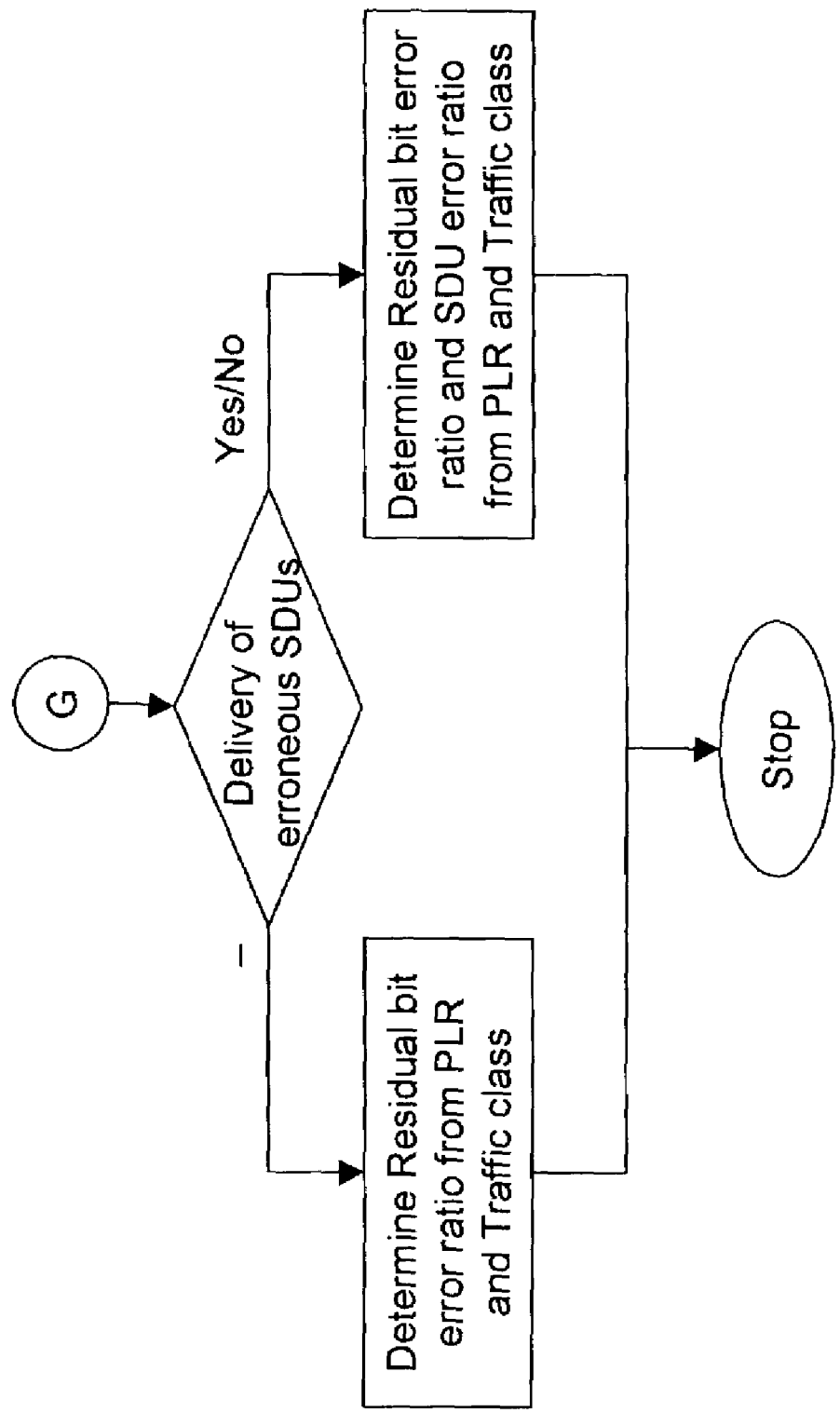
Figure 16:
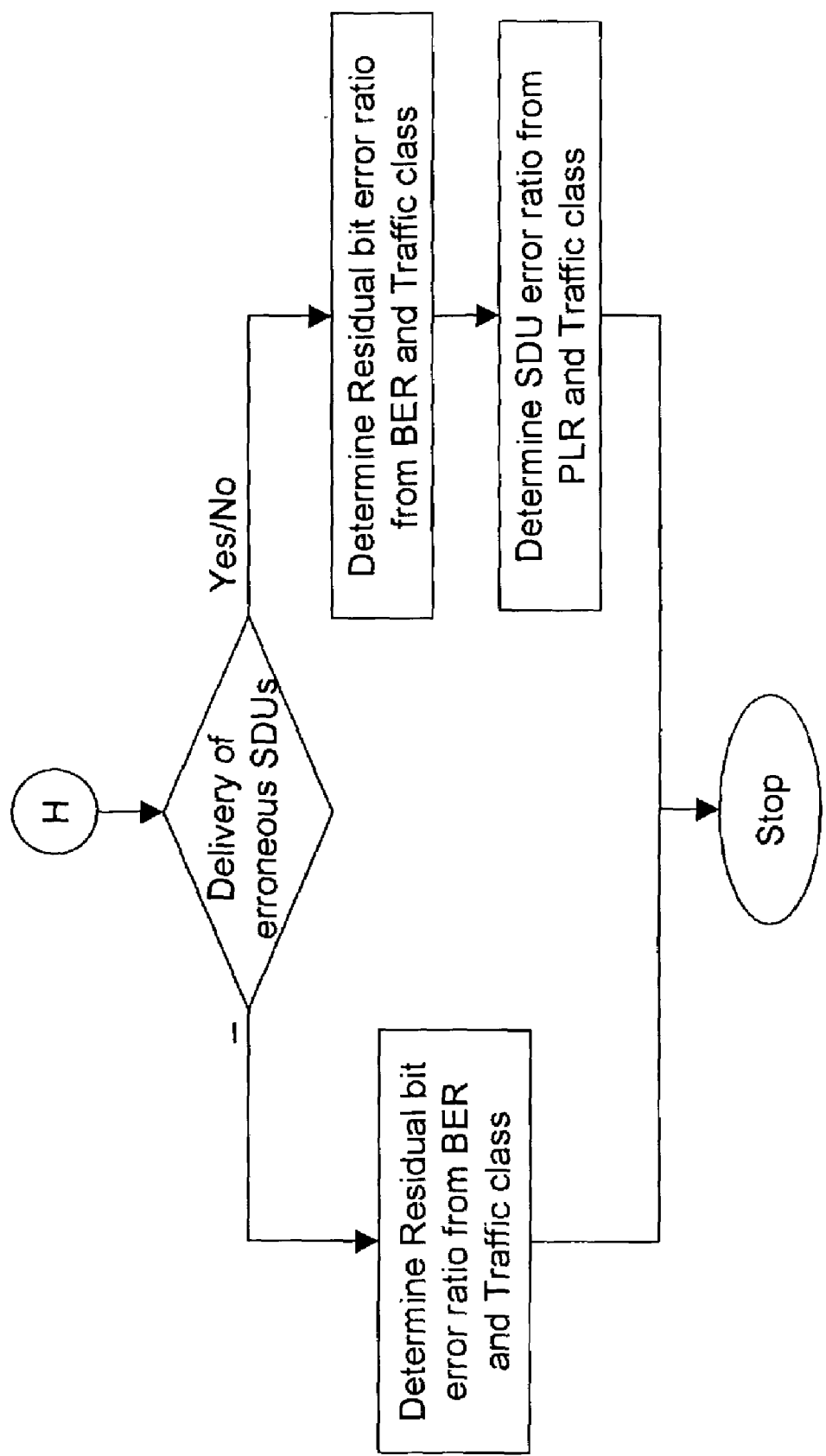

Referring now to FIG. 13, values of SDU-error-ratio and Residual-bit-error-ratio are determined using corresponding parameters in IP i.e. Packet-Loss-Ratio (PLR) and Bit-Error-Ratio (BER). A check is made to determine whether PLR is set at step 1301 and BER are set at step 1303 or 1305. If both PLR and BER are set, PLR is used to determine SDU-error-ratio, and BER is used to determine Residual-bit-error-ratio. If only one of the parameters is set, it is used to determine both SDU-error-ratio and Residual-bit-error-ratio. If none of the parameters is set, default values are used to set these attributes at step 1307. The details are illustrated in FIGS. 14 through 16.

Figure 14:
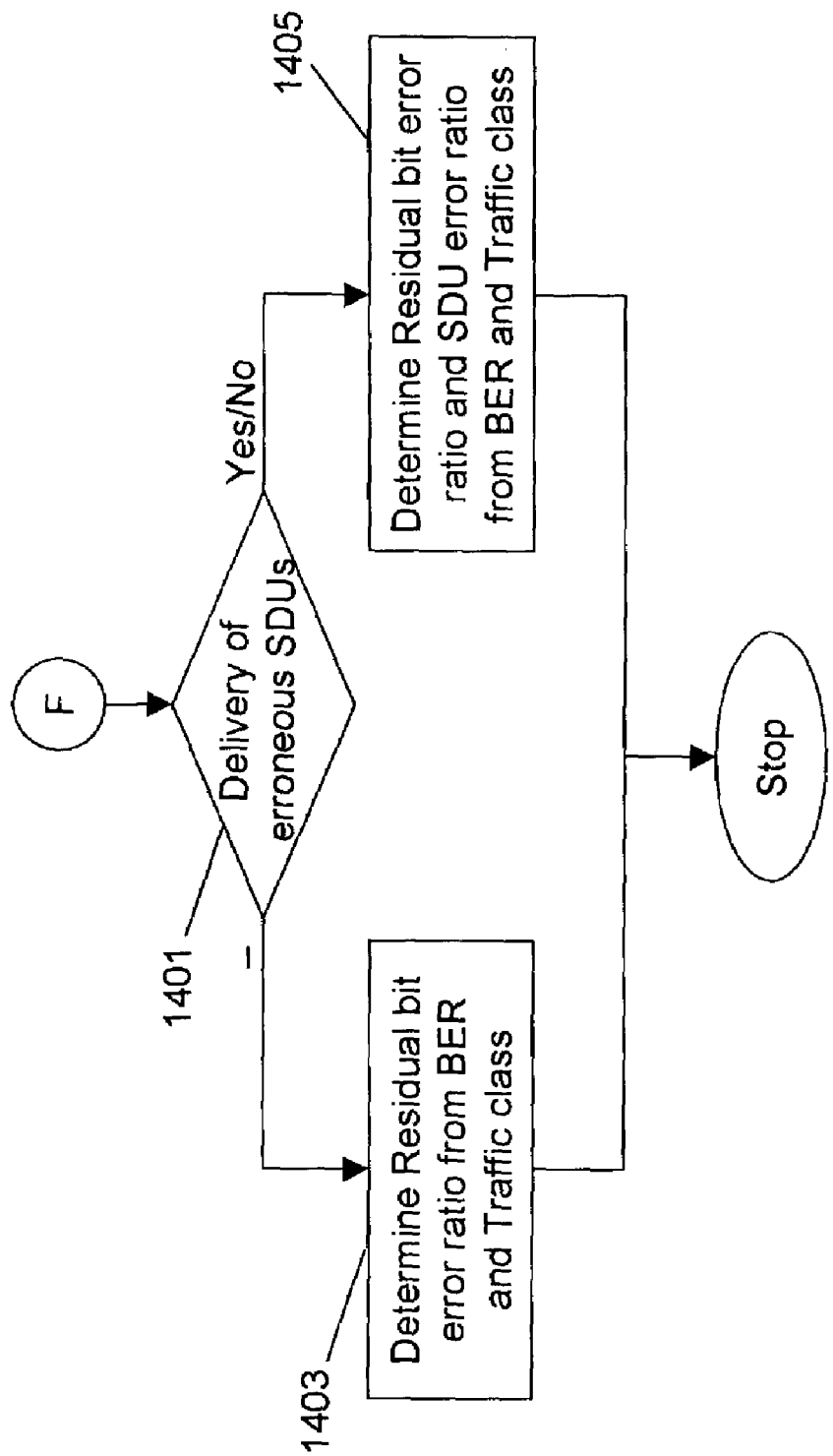

FIG. 14 illustrates determining SDU-error-ratio and Residual-bit-error-ratio using only BER.

First, a check is made to determine whether Delivery-of-erroneous-SDUs is set to (Yes/No) or to (–) at step 1401 (i.e. whether error detection is being done or not). If Delivery-of-erroneous-SDUs is set to (–), error detection is not done and SDU-error-ratio is not set. Residual-bit-error-ratio, which in this case defines the total bit error ratio, is determined from BER at step 1403. For different Traffic-classes, mapping of BER to Residual-bit-error-ratio can be different. On the other hand, if Delivery-of-erroneous-SDUs is set to (Yes/No), value of SDU-error-ratio can also be determined from BER and information about Traffic-class in a similar manner at step 1405. Residual-bit-error-ratio defines now the undetected bit error ratio.

The abovementioned method is used for each Radio Access Bearer (RAB) subflow to support unequal error protection (UEP). UEP implies that different parts of an IP payload are associated with different error protection mechanisms when transferring over the air interface. UEP is supported by underlying Radio Bearer Services. This is described further in detail in 3GPP TS 23.107.

FIG. 15 illustrates determining SDU-error-ratio and Residual-bit-error-ratio using only PLR. The procedure is similar to the case as discussed with reference to FIG. 14 above.

FIG. 16 illustrates determining SDU-error-ratio and Residual-bit-error-ratio using PLR and BER, respectively. The procedure is similar to the case as discussed with reference to FIG. 14 above.

All the above mentioned discussion was related to translation of IP QoS parameters to UMTS QoS attributes when MIME parameters are not set at step 1001. If MIME parameters are set, it is possible to use these parameters to achieve a more optimized bearer service in the UMTS. One specific case is when AMR codec is used to encode audio content. This specific case is discussed in detail in FIGS. 17 through 19 followed by FIGS. 13 through 16.

Figure 17:
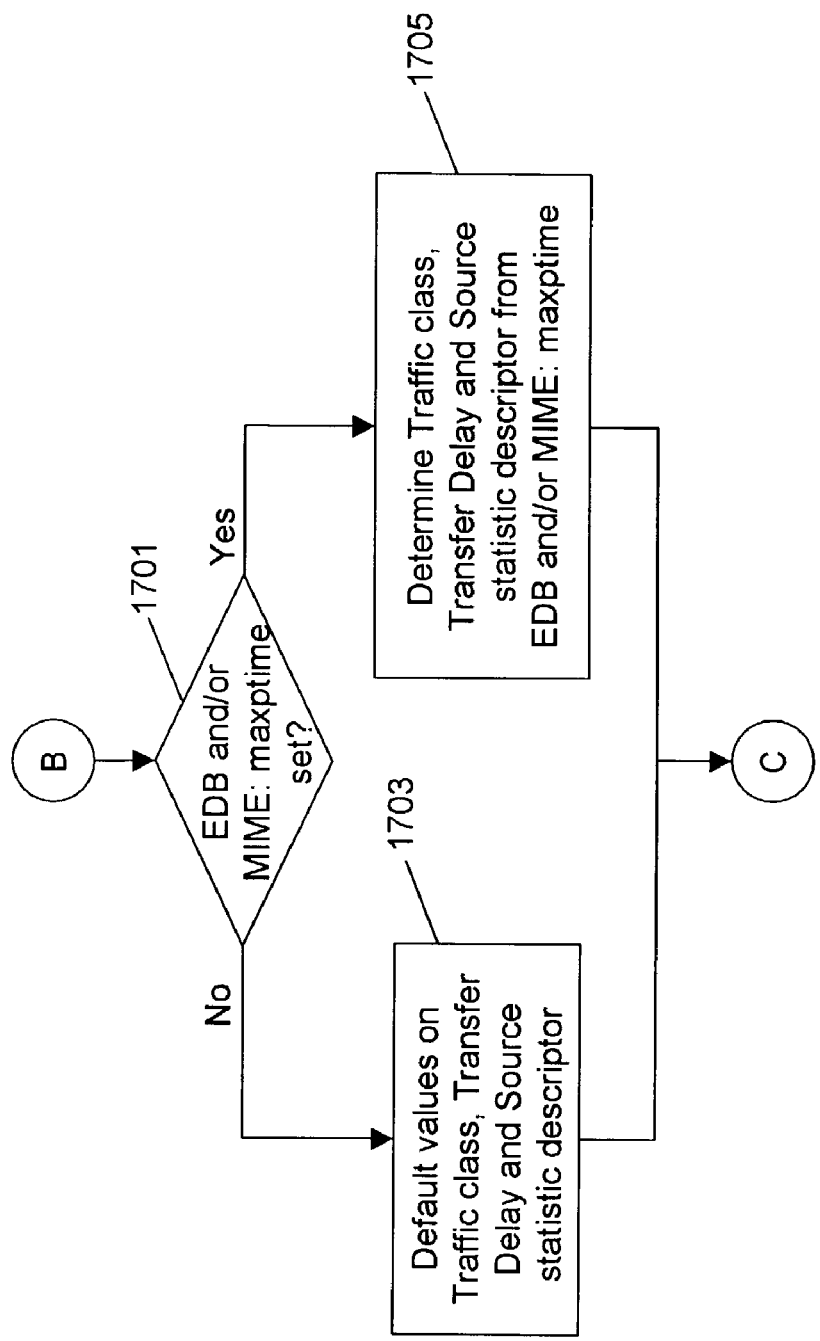

Referring now to FIG. 17, a check is made to determine whether EDB and AMR specific MIME parameter maxptime are set at step 1701. If EDB and/or maxptime are set, either EDB or maxptime, or both EDB and maxptime, are used to determine Traffic-class, Transfer-delay and Source-statistic-descriptor at step 1705. EDB and/or maxptime can be used to differentiate between Conversational class and streaming class. If only one of the parameters is set at step 1701, that parameter is used to set the attributes at step 1705. If none of the parameters are set at step 1701, the attributes are set by default values at step 1703.

Figure 18:
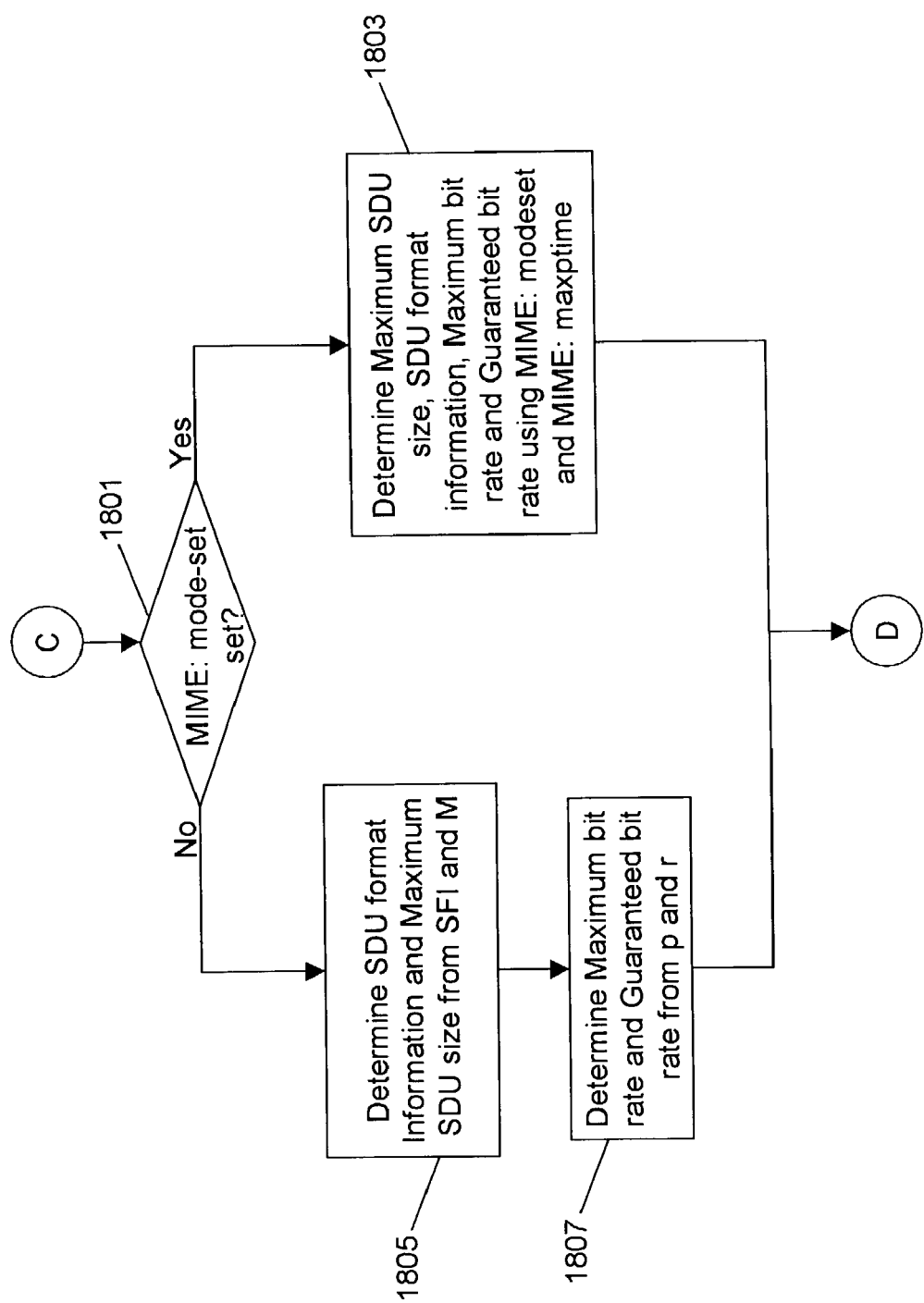

Referring now to FIG. 18, the UMTS bearer can be further optimized for providing better services if the exact payload format of IP packets can be known and mapped to corresponding UMTS attributes. If AMR parameters are set, mode-set is checked for at step 1801. If it is set, Maximum-SDU-size, SDU-format-information, Maximum-bit-rate and Guaranteed-bit-rate are determined from mode-set and maxptime at step 1803. If mode-set is not set at step 1801, Maximum-SDU-size and SDU-format-information are determined from SFI and Maximum-Packet-Size at step 1805. Further Maximum-bit-rate and Guaranteed-bit-rate are determined from Peak-Rate and Token-Rate respectively at step 1807.

Figure 19:
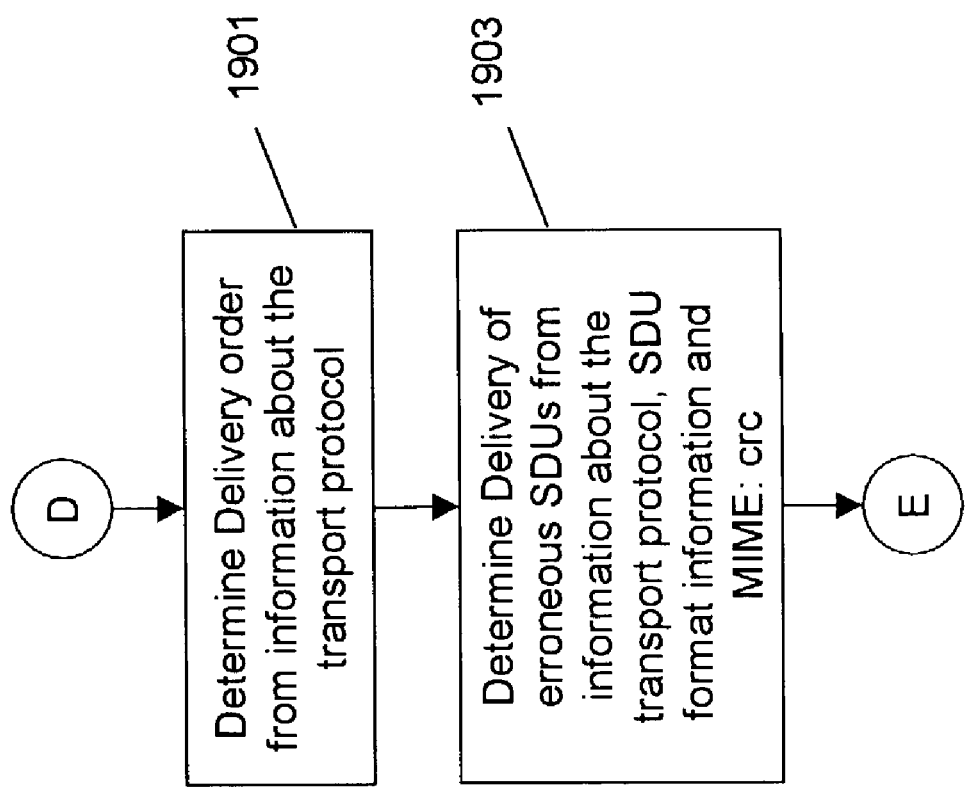

Referring now to FIG. 19, UMTS attribute Delivery-order is determined using information about the transport protocol used, at step 1901. Delivery-of-erroneous-SDUs is determined using information about the transport protocol used, SDU-format-information and AMR specific MIME parameter crc, at step 1903.

After Delivery-of-erroneous-SDUs has been set, values of SDU-error-ratio and Residual-bit-error-ratio are determined using corresponding parameters in IP i.e. PLR and BER. These are illustrated in detail in FIGS. 13 through 16, and have already been discussed in the preceding discussion.

Having discussed in detail translation of IP QoS parameters to UMTS QoS attributes, translation of UMTS QoS attributes to IP QoS parameters is now illustrated in FIGS. 20 through 22. This translation assumes that it is not possible to determine values of MIME parameters using UMTS QoS attributes. Hence, only IntServ CL and Wireless hints parameters of IP QoS are determined.

Referring now to FIG. 20, Traffic-class is first checked at step 2001 to find out whether it is Streaming/Conversational or Background/interactive. In case of Streaming and Conversational classes, EDB is set at step 2003, whereas for Background and Interactive classes, PHP is set at step 2007. EDB and PHP are determined from corresponding UMTS attributes that are Transfer-delay and Traffic-handling-priority respectively. Peak-Rate and Token-Rate are determined from the corresponding UMTS parameters Maximum-bit-rate at step 2011 and Guaranteed-bit-rate at step 2005 respectively; except when the traffic is Interactive or Background in which case Token-Rate is determined from Maximum-bit-rate at step 2009. This is because Guaranteed-bit-rate is not set in case of Interactive/Background classes.

Referring now to FIG. 21, SDU-format information is checked for at step 2101 to determine Maximum-Packet-Size and SFI. Maximum-Packet-Size and SFI are determined using SDU-format information at steps 2103 and 2105 respectively. In case SDU-format-information is not set, Maximum-Packet-Size is set using Maximum-SDU-size at step 2107.

Finally, values of PLR and BER are determined using SDU-error-ratio and Residual-bit-error-ratio. This is illustrated in detail in FIG. 22. If multiple Radio Access Bearer (RAB) subflows are used, and different values of SDU-error-ratio and/or Residual-bit-error-ratio are specified for the respective subflows, the method illustrated by FIG. 22 is used for each RAB subflow.

First, at step 2201, it is determined whether Delivery-of-erroneous-SDUs is set to (Yes/No) (i.e. whether error detection is being applied). If Delivery-of-erroneous-SDUs is set to (Yes/No), PLR and BER are determined from corresponding UMTS attributes SDU-error-ratio at step 2205 and Residual-bit-error-ratio at step 2207 respectively. The mapping of SDU-error-ratio to PLR and Residual-bit-error-ratio to BER is also dependent on Traffic-class. If Delivery-of-erroneous-SDUs is set to (–), SDU-error-ratio is not set in UMTS. Hence, only Residual-bit-error-ratio and Traffic-class are used to set PLR and BER in the manner as discussed above, at step 2203.

While the preferred embodiment of the present invention has been described, additional variations and modifications in that embodiment may occur to those skilled in the art once they learn of the basic inventive concepts. Values for various parameters mentioned in the description of the preferred embodiment are merely illustrative in nature. Therefore, it is intended that the appended claims shall be construed to include both the preferred embodiment, and all such variations and modifications as fall within the spirit and scope of the invention.

What is claimed is:

1. A method for translation between IP Quality of Service (QoS) parameters and Universal Mobile Telecommunications Service (UMTS) QoS attributes, said method comprising the steps of:
   a. translating IP QoS parameters to UMTS QoS attributes; and
   b. translating UMTS QoS attributes to IP QoS parameters; wherein said step of translating IP QoS parameters to UMTS QoS attributes comprises the steps of:
   a. checking for Multipurpose Internet Mail Extensions (MIME) parameters;
   b. determining UMTS Qos attributes using Controlled Load parameters and wireless hints, if MIME parameters are not set; and
   c. determining UMTS QoS attributes using Controlled Load parameters, wireless hints and MIME parameters, if MIME parameters are set.

2. The method according to claim 1, wherein said step of checking for MIME parameters further comprises the steps of:
   a. checking MIME media-type, if MIME parameters are set; and
   b. checking MIME encoding for Adaptive Multi Rate (AMR), if MIME media-type is audio.

3. The method according to claim 1, wherein said step of determining UMTS QoS attributes, if MIME parameters are not set, or if MIME parameters are set and MIME media-type is other than audio, or if MIME parameters are set and MIME media-type is audio and MIME encoding is other than AMR, said method further comprises the steps of:
   a. determining Traffic-class, Transfer-delay, Source-statistic-descriptor, Traffic-handling-priority, Guaranteed-bit-rate, Maximum-bit-rate, Maximum-Service Data Unit (SDU)-size and SDU-format-information (SFI) using Expected-Delay-Bound, Packet-Handling-Priority, Maximum-Packet-Size, Token-Rate and Peak-Rate;
   b. determining Delivery-order and Delivery-of-erroneous-SDUs using information about transport protocol used; and
   c. determining SDU-error-ratio and Residual-bit-error-ratio using Packet-Loss-Ratio and Bit-Error-Ratio.

4. The method according to claim 3, wherein said step of determining Traffic-class, Transfer-delay, Source-statistic-descriptor, Traffic-handling-priority, Guaranteed-bit-rate, Maximum-bit-rate, Maximum-SDU-size and SDU-format-information using Expected-Delay-Bound, Packet-Handling-Priority, SFI, Maximum-Packet-Size, Token-Rate and Peak-Rate, further comprises the steps of:
   a. checking whether Expected-Delay-Bound is set;
   b. determining Traffic-class, Transfer-delay, Source-statistic-descriptor, Guaranteed-bit-rate, Maximum-bit-rate, Maximum-SDU-size and SDU-format-information using Expected-Delay-Bound, Token-Rate, SFI, Maximum-Packet-Size and Peak-Rate, if Expected-Delay-Bound is set;
   c. determining Traffic-class, Traffic-handling-priority, Maximum-SDU-size and Maximum-bit-rate using Packet-Handling-Priority, Maximum-Packet-Size and Peak-Rate, if Expected-Delay-Bound is not set.

5. The method according to claim 3, wherein said step of determining SDU-error-ratio and Residual-bit-error-ratio using Packet-Loss-Ratio and Bit-Error-Ratio, further comprises the steps of:
   a. checking whether Packet-Loss-Ratio is set;
   b. checking whether Bit-Error-Ratio is set;
   c. determining SDU-error-ratio and Residual-bit-error-ratio using pre-determined values, if Packet-Loss-Ratio and Bit-Error-Ratio are not set;
   d. determining SDU-error-ratio and Residual-bit-error-ratio using Bit-Error-Ratio, if Packet-Loss-Ratio is not set and Bit-Error-Ratio is set;
   e. determining SDU-error-ratio and Residual-bit-error-ratio using Packet-Loss-Ratio, if Packet-Loss-Ratio is set and Bit-Error-Ratio is not set; and
   f. determining SDU-error-ratio and Residual-bit-error-ratio using Packet-Loss-Ratio and Bit-Error-Ratio, if Packet-Loss-Ratio and Bit-Error-Ratio are set.

6. The method according to claim 5, wherein said step of determining SDU-error-ratio and Residual-bit-error-ratio using Bit-Error-Ratio, if Packet-Loss-Ratio is not set and Bit-Error-Ratio is set, further comprises the steps of:

a. if the number of Radio Access Bearer (RAB) sub-flows is one, performing substeps of:
  i. checking for Delivery-of-erroneous-SDUs;
  ii. determining Residual-bit-error-ratio using Bit-Error-Ratio and Traffic-class, if Delivery-of-erroneous-SDUs is set to –; and
  iii. determining both Residual-bit-error-ratio and SDU-error-ratio using Bit-Error-Ratio and Traffic-class, if Delivery-of-erroneous-SDUs is set to Yes/No; and
b. repeating step a for each RAB sub-flow if more than one.

7. The method according to claim 5, wherein said step of determining SDU-error-ratio and Residual-bit-error-ratio using Packet-Loss-Ratio, if Packet-Loss-Ratio is set and Bit-Error-Ratio is not set, further comprises the steps of:
  a. if the number of Radio Access Bearer (RAB) sub-flows is one, performing substeps of:
    i. checking for Delivery-of-erroneous-SDUs;
    ii. determining Residual-bit-error-ratio using Packet-Loss-Ratio and Traffic-class, if Delivery-of-erroneous-SDUs is set to –; and
    iii. determining both Residual-bit-error-ratio and SDU-error-ratio using Packet-Loss-Ratio and Traffic-class, if Delivery-of-erroneous-SDUs is set Yes/No; and
  b. repeating step a for each RAB sub-flow if more than one.

8. The method according to claim 5, wherein said step of determining SDU-error-ratio and Residual-bit-error-ratio using Packet-Loss-Ratio and Bit-Error-Ratio, if Packet-Loss-Ratio and Bit-Error-Ratio are set, further comprises the steps of:
  a. if the number of Radio Access Bearer (RAB) sub-flows is one, performing substeps of:
    i. checking for Delivery-of-erroneous-SDUs;
    ii. determining Residual-bit-error-ratio using Bit-Error-Ratio and Traffic-class, if Delivery-of-erroneous-SDUs is set to –; and
    iii. determining Residual-bit-error-ratio and SDU-error-ratio using Bit-Error-Ratio, Packet-Loss-Ratio and Traffic-class, if Delivery-of-erroneous-SDUs is set to Yes/No; and
  b. repeating step a each RAB sub-flow if more than one.

9. The method according to claim 2, wherein said step of determining UMTS QoS attributes using Controlled Load parameters, wireless hints and MIME parameters, if MIME media type is audio and MIME encoding is AMR, further comprises the steps of:
  a. determining Traffic-class, Transfer-delay and Source-statistic-descriptor using Expected-Delay-Bound and/or maxptime, if one of Expected-Delay-Bound and maxptime is set, or both Expected-Delay-Bound and maxptime are set;
  b. determining Traffic-class, Transfer-delay and Source-statistic-descriptor using pre-determined values if Expected-Delay-Bound and maxptime are not set;
  c. determining Maximum-bit-rate, Guaranteed-bit-rate, SDU-format-information (SFI) and Maximum-SDU-size using mode-set, maxptime, Maximum-Packet-Size, Peak-Rate and Token-Rate;
  d. determining Delivery-order using information about transport protocol used;
  e. determining Delivery-of-erroneous-SDUs using information about transport protocol used, SDU-format-information and crc; and
  f. determining SDU-error-ratio and Residual-bit-error-ratio using Packet-Loss-Ratio and Bit-Error-Ratio.

10. The method according to claim 9, wherein said step of determining Traffic-class, Transfer-delay and Source-statistic-descriptor using Expected-Delay-Bound and/or maxptime, if one of Expected-Delay-Bound and maxptime is set, or both Expected-Delay-Bound and maxptime are set, further comprises the steps of:
  a. checking whether Expected-Delay-Bound and/or maxptime are set;
  b. determining Traffic-class, Transfer-delay and Source-statistic-descriptor using Expected-Delay-Bound, if Expected-Delay-Bound is set and maxptime is not set;
  c. determining Traffic-class, Transfer-delay and Source-statistic-descriptor using maxptime, if Expected-Delay-Bound is not set and maxptime is set; and
  d. determining Traffic-class, Transfer-delay and Source-statistic-descriptor using Expected-Delay-Bound and/or maxptime, if Expected-Delay-Bound and maxptime are set.

11. The method according to claim 9, wherein said step of determining Maximum-bit-rate, Guaranteed-bit-rate, SDU-format-information (SFI) and Maximum-SDU-size using mode-set, maxptime, Maximum-Packet-Size, Peak-Rate and Token-Rate, further comprises the steps of:
  a. checking whether mode-set is set;
  b. determining Maximum-SDU-size, SDU-format-information, Maximum-bit-rate and Guaranteed-bit-rate using maxptime and mode-set, if mode-set is set;
  c. determining SDU-format-information and Maximum-SDU-size using SFI and Maximum-Packet-Size, if mode-set is not set; and
  d. determining Maximum-bit-rate and Guaranteed-bit-rate using Peak-Rate and Token-Rate, if mode-set is not set.

12. The method according to claim 9, wherein said step of determining SDU-error-ratio and Residual-bit-error-ratio using Packet-Loss-Ratio and Bit-Error-Ratio, further comprises the steps of:
  a. checking whether Packet-Loss-Ratio is set;
  b. checking whether Bit-Error-Ratio is set;
  c. determining SDU-error-ratio and Residual-bit-error-ratio using pre-determined values, if Packet-Loss-Ratio and Bit-Error-Ratio are not set;
  d. determining SDU-error-ratio and Residual-bit-error-ratio using Bit-Error-Ratio, if Packet-Loss-Ratio is not set and Bit-Error-Ratio is set;
  e. determining SDU-error-ratio and Residual-bit-error-ratio using Packet-Loss-Ratio, if Packet-Loss-Ratio is set and Bit-Error-Ratio is not set; and
  f. determining SDU-error-ratio and Residual-bit-error-ratio using Packet-Loss-Ratio and Bit-Error-Ratio, if Packet-Loss-Ratio and Bit-Error-Ratio are set.

13. The method according to claim 12, wherein said step of determining SDU-error ratio and Residual-bit-error-ratio using Bit-Error-Ratio, if Packet-Loss-Ratio is not set and Bit-Error-Ratio is set, further comprises the steps of:
  a. if the number of Radio Access Bearer (RAB) sub-flows is one, performing substeps of:
    i. checking for Delivery-of-erroneous-SDUs;
    ii. determining Residual-bit-error-ratio using Bit-Error-Ratio and Traffic-class, if Delivery-of-erroneous-SDUs is set to –; and
    iii. determining both Residual-bit-error-ratio and SDU-error-ratio using Bit-Error-Ratio and Traffic-class, if Delivery-of-erroneous-SDUs is set to Yes/No; and
  b. repeating step a for each RAB sub-flow if more than one.

14. The method according to claim 12, wherein said step of determining SDU-error-ratio and Residual-bit-error-ratio using Packet-Loss-Ratio, if Packet-Loss-Ratio is set and Bit-Error-Ratio is not set, further comprises the steps of:
   a. if the number of Radio Access Bearer (RAB) sub-flows is one, performing substeps of:
      i. checking for Delivery-of-erroneous-SDUs;
      ii. determining Residual-bit-error-ratio using Packet-Loss-Ratio and Traffic-class, if Delivery-of-erroneous-SDUs is set to –; and
      iii. determining both Residual-bit-error-ratio and SDU-error-ratio using Packet-Loss-Ratio and Traffic-class, if Delivery-of-erroneous-SDUs is set to Yes/No; and
   b. repeating step a for each RAB sub-flow if more than one.

15. The method according to claim 12, wherein said step of determining SDU-error-ratio and Residual-bit-error-ratio using Packet-Loss-Ratio and Bit-Error-Ratio, if Packet-Loss-Ratio and Bit-Error-Ratio are set, further comprises the steps of:
   a. if the number of Radio Access Bearer (RAB) sub-flows is one, performing substeps of:
      i. checking for Delivery-of-erroneous-SDUs;
      ii. determining Residual-bit-error-ratio using Bit-Error-Ratio and Traffic-class, if Delivery-of-erroneous-SDUs is set to –; and
      iii. determining both Residual-bit-error-ratio and SDU-error-ratio using Bit-Error-Ratio, Packet-Loss-Ratio and Traffic-class, if Delivery-of-erroneous-SDUs is set to Yes/No; and
   b. repeating step a for each RAB sub-flow if more than one.

16. The method according to claim 1, wherein said step of translating UMTS QoS attributes to IP QoS parameters comprises the steps of:
   a. determining Expected-Delay-Bound, Packet-Handling-Priority, Token-Rate and Peak-Rate using Traffic-class, Transfer-delay, Traffic-handling-priority, Guaranteed-bit-rate and Maximum-bit-rate;
   b. determining Maximum-Packet-Size and Service Data Unit (SDU) Format information (SFI) using Maximum-SDU-size and SDU-format-information; and
   c. determining Packet-Loss-Ratio and Bit-Error-Ratio using Residual-bit-error-ratio and SDU-error-ratio.

17. The method according to claim 16, wherein said step of determining Expected-Delay-Bound, Packet-Handling-Priority, Token-Rate and Peak-Rate using Traffic-class, Transfer-delay, Traffic-handling-priority, Guaranteed-bit-rate and Maximum-bit-rate, further comprises the steps of:
   a. checking for Traffic-class;
   b. determining Token-Rate using Guaranteed-bit-rate, if Traffic-class is Streaming or Conversational;
   c. determining Peak-Rate using Maximum-bit-rate, if Traffic-class is Streaming or Conversational;
   d. determining Expected-Delay-Bound using Transfer-delay, if Traffic-class is Streaming or Conversational;
   e. determining Token-Rate using Maximum-bit-rate, if Traffic-class is Background or Interactive;
   f. determining Peak-Rate using Maximum-bit-rate, if Traffic-class is Background or Interactive;
   g. determining Packet-Handling-Priority using Traffic-handling-priority, if Traffic-class is Background or Interactive.

18. The method according to claim 16, wherein said step of determining Maximum-Packet-Size and SFI using Maximum-SDU-size and SDU-format-information further comprises the steps of:
   a. checking whether SDU-format-information is set;
   b. determining Maximum-Packet-Size using SDU-format-information, if SDU-format-information is set;
   c. determining SFI using SDU-format-information, if SDU-format-information is set; and
   d. determining Maximum-Packet-Size using Maximum-SDU-size, if SDU-format-information is not set.

19. The method according to claim 16, wherein said step of determining Packet-Loss-Ratio and Bit-Error-Ratio using Residual-bit-error-ratio and SDU-error-ratio, further comprises the steps of:
   a. if multiple Radio Access Bearer (RAB) sub-flows and different values of SDU-error-ratio and/or Residual-bit-error-ratio are not set for the respective sub-flows, performing substeps of:
      i. checking for Delivery-of-erroneous-SDUs;
      ii. determining Packet-Loss-Ratio and Bit-Error-Ratio using Residual-bit-error-ratio and Traffic-class, if Delivery-of-erroneous-SDUs is set to –; and
      iii. determining Packet-Loss-Ratio and Bit-Error-Ratio using SDU-error-ratio, Residual-bit-error-ratio and Traffic-class, if Delivery-of-erroneous-SDUs is set to Yes/No; and
   b. repeating step a for all RAB sub-flows, if different values of SDU-error-ratio and/or Residual-bit-error-ratio are set for the respective sub-flows.

20. A method in a network node equipment for translation between IP Quality of Service (QoS) parameters and Universal Mobile Telecommunications Service (UMTS) QoS attributes, wherein the network node equipment is in communication with a radio network, said method comprising the steps of:
   a. translating IP QoS parameters to UMTS QoS attributes; and
   b. translating UMTS QoS attributes to IP QoS parameters; wherein said step of translating IP QoS parameters to UMTS QoS attributes comprises the steps of;
   a. checking for Multipurpose Internet Mail Extensions (MIME) parameters;
   b. determining UMTS QoS attributes using Controlled Load parameters and wireless hints, if MIME parameters are not set; and
   c. determining UMTS QoS attributes using Controlled Load parameters and wireless hints and MIME parameters, if MIME parameters are set.

21. The method in a network node equipment according to claim 20, wherein network node equipment is a user equipment.

22. The method in a network node equipment according to claim 20, wherein network node equipment is a gateway.

23. The method in a network node equipment according to claim 20, wherein said step of checking for MIME parameters further comprises the steps of:
   a. checking MIME media-type, if MIME parameters are set; and
   b. checking MIME encoding for Adaptive Multi Rate (AMR), if MIME media-type is audio.

24. The method in a network node equipment according to claim 20, wherein said step of determining UMTS QoS attributes, if MIME parameters are not set further comprises the steps of:
   a. determining Traffic-class, Transfer-delay, Source-statistic-descriptor, Traffic-handling-priority, Guaranteedbit-rate, Maximum-bit-rate, Maximum-Service Data Unit SDU-size and SDU-format-information (SFI) using Expected-Delay-Bound, Packet-Handling-Priority, SFI, Maximum-Packet-Size, Token-Rate and Peak-Rate;

b. determining Delivery-order and Delivery-of-erroneous-SDUs using information about transport protocol used; and c. determining SDU-error-ratio and Residual-bit-error-ratio using Packet-Loss-Ratio and Bit-Error-Ratio.

25. The method in a network node equipment according to claim 24, wherein said step of determining Traffic-class, Transfer-delay, Source-statistic-descriptor, Traffic-handling-priority, Guaranteed-bit-rate, Maximum-bit-rate, Maximum-SDU-size and SDU-format-information using Expected-Delay-Bound, Packet-Handling-Priority, SFI, Maximum-Packet-Size, Token-Rate and Peak-Rate, further comprises the steps of:

a. checking whether Expected-Delay-Bound is set;

b. determining Traffic-class, Transfer-delay, Source-statistic-descriptor, Guaranteed-bit-rate, Maximum-bit-rate, Maximum-SDU-size and SDU-format-information using Expected-Delay-Bound, Token-Rate, SFI, Maximum-Packet-Size and Peak-Rate, if Expected-Delay-Bound is set;

c. determining Traffic-class, Traffic-handling-priority, Maximum-SDU-size and Maximum-bit-rate using Packet-Handling-Priority, Maximum-Packet-Size and Peak-Rate, if Expected-Delay-Bound is not set.

26. The method in a network node equipment according to claim 24, wherein said step of determining SDU-error-ratio and Residual-bit-error-ratio using Packet-Loss-Ratio and Bit-Error-Ratio, further comprises the steps of:

a. checking whether Packet-Loss-Ratio is set;

b. checking whether Bit-Error-Ratio is set;

c. determining SDU-error-ratio and Residual-bit-error-ratio using pre-determined values, if Packet-Loss-Ratio and Bit-Error-Ratio are not set;

d. determining SDU-error-ratio and Residual-bit-error-ratio using Bit-Error-Ratio, if Packet-Loss-Ratio is not set and Bit-Error-Ratio is set;

e. determining SDU-error-ratio and Residual-bit-error-ratio using Packet-Loss-Ratio, if Packet-Loss-Ratio is set and Bit-Error-Ratio is not set; and f. determining SDU-error-ratio and Residual-bit-error-ratio using Packet-Loss-Ratio and Bit-Error-Ratio, if Packet-Loss-Ratio and Bit-Error-Ratio are set.

27. The method in a network node equipment according to claim 26, wherein said step of determining SDU-error-ratio and Residual-bit-error-ratio using Bit-Error-Ratio, if Packet-Loss-Ratio is not set and Bit-Error-Ratio is set, further comprises the steps of:

a. if the number of Radio Access Bearer (RAB) sub-flows is one, performing substeps of:
   i. checking for Delivery-of-erroneous-SDUs;
   ii. determining Residual-bit-error-ratio using Bit-Error-Ratio and Traffic-class, if Delivery-of-erroneous-SDUs is set to –; and
   iii. determining both Residual-bit-error-ratio and SDU-error-ratio using Bit-Error-Ratio and Traffic-class, if Delivery-of-erroneous-SDUs is set to Yes/No; and b. repeating step a for each RAB sub-flow if more than one.

28. The method in a network node equipment according to claim 26, wherein said step of determining SDU-error-ratio and Residual-bit-error-ratio using Packet-Loss-Ratio, if Packet-Loss-Ratio is set and Bit-Error-Ratio is not set, further comprises the steps of:

a. if the number of Radio Access Bearer (RAB) sub-flows is one, performing substeps of:
   i. checking for Delivery-of-erroneous-SDUs;
   ii. determining Residual-bit-error-ratio using Packet-Loss-Ratio and Traffic-class, if Delivery-of-erroneous-SDUs is set to –; and
   iii. determining both Residual-bit-error-ratio and SDU-error-ratio using Packet-Loss-Ratio and Traffic-class, if Delivery-of-erroneous-SDUs is set to Yes/No; and b. repeating step a for each RAB sub-flow if more than one.

29. The method in a network node equipment according to claim 26, wherein said step of determining SDU-error-ratio and Residual-bit-error-ratio using Packet-Loss-Ratio and Bit-Error-Ratio, if Packet-Loss-Ratio and Bit-Error-Ratio are set, further comprises the steps of:

a. if the number of Radio Access Bearer (RAB) sub-flows is one, performing substeps of:
   i. checking for Delivery-of-erroneous-SDUs;
   ii. determining Residual-bit-error-ratio using Bit-Error-Ratio and Traffic-class, if Delivery-of-erroneous-SDUs is set to –; and
   iii. determining both Residual-bit-error-ratio and SDU-error-ratio using Bit-error-ratio, using Bit-Error-Ratio, Packet-Loss-Ratio and Traffic-class, if Delivery-of-erroneous-SDUs is set to Yes/No; and b. repeating step a for each RAB sub-flow if more than one.

30. The method in a network node equipment according to claim 23, wherein said step of determining UMTS QoS attributes using Controlled Load parameters, wireless hints and MIME parameters, if MIME parameters are set, if MIME media type is audio and MIME encoding is AMR, further comprises the steps of:

a. determining Traffic-class, Transfer-delay and Source-statistic-descriptor using Expected-Delay-Bound and/or maxptime, if one of Expected-Delay-Bound and maxptime is set, or both Expected-Delay-Bound and maxptime are set;

b. determining Traffic-class, Transfer-delay and Source-statistic-descriptor using pre-determined values if Expected-Delay-Bound and maxptime are not set;

c. determining Maximum-bit-rate, Guaranteed-bit-rate, SDU-format-information and Maximum-SDU-size using mode-set, maxptime, SFI, Maximum-Packet-Size, Peak-Rate and Token-Rate;

d. determining Delivery-order using information about transport protocol used;

e. determining Delivery-of-erroneous-SDUs using information about transport protocol used, SDU-format-information and crc; and f. determining SDU-error-ratio and Residual-bit-error-ratio using Packet-Loss-Ratio and Bit-Error-Ratio.

31. The method in a network node equipment according to claim 30, wherein said step of determining Traffic-class, Transfer-delay and Source-statistic-descriptor using Expected-Delay-Bound and/or maxptime, if one of Expected-Delay-Bound and maxptime are set, or both Expected-Delay-Bound and maxptime are set, further comprises the steps of:

a. checking whether Expected-Delay-Bound and/or maxptime are set;

b. determining Traffic-class, Transfer-delay and Source-statistic-descriptor using Expected-Delay-Bound, if Expected-Delay-Bound is set and maxptime is not set;
c. determining Traffic-class, Transfer-delay and Source-statistic-descriptor using maxtime, if Expected-Delay-Bound is not set and maxptime is set; and
d. determining Traffic-class, Transfer-delay and Source-statistic-descriptor using Expected-Delay-Bound and/or maxptime, if Expected-Delay-Bound and maxptime are set.

32. The method in a network node equipment according to claim 30, wherein said step of determining Maximum-bit-rate, Guaranteed-bit-rate, SDU-format-information and Maximum-SDU-size using mode-set, maxptime, SFI, Maximum-Packet-Size, Peak-Rate and Token-Rate, further comprises the steps of:
a. checking whether mode-set is set;
b. determining Maximum-SDU-size, SDU-format-information, Maximum-bit-rate and Guaranteed-bit-rate using maxptime and mode-set, if mode-set is set;
c. determining SDU-format-information and Maximum-SDU-size using SFI and Maximum-Packet-Size, if mode-set is not set; and
d. determining Maximum-bit-rate and Guaranteed-bit-rate using Peak-Rate and Token-Rate, if mode-set is not set.

33. The method in a network node equipment according to claim 30, wherein said step of determining SDU-error-ratio and Residual-bit-error-ratio using Packet-Loss-Ratio and Bit-Error-Ratio, further comprises the steps of:
a. checking whether Packet-Loss-Ratio is set;
b. checking whether Bit-Error-Ratio is set;
c. determining SDU-error-ratio and Residual-bit-error-ratio using pre-determined values, if Packet-Loss-Ratio and Bit-Error-Ratio are not set;
d. determining SDU-error-ratio and Residual-bit-error-ratio using Bit-Error-Ratio, if Packet-Loss-Ratio is not set and Bit-Error-Ratio is set;
e. determining SDU-error-ratio and Residual-bit-error-ratio using Packet-Loss-Ratio, if Packet-Loss-Ratio is set and Bit-Error-Ratio is not set; and
f. determining SDU-error-ratio and Residual-bit-error-ratio using Packet-Loss-Ratio and Bit-Error-Ratio, if Packet-Loss-Ratio and Bit-Error-Ratio are set.

34. The method in a network node equipment according to claim 33, wherein said step of determining SDU-error ratio and Residual-bit-error-ratio using Bit-Error-Ratio, if Packet-Loss-Ratio is not set and Bit-Error-Ratio is set, further comprises the steps of:
a. if the number of Radio Access Bearer (RAB) sub-flows is one, performing substeps of: i. checking for Delivery-of-erroneous-SDUs; ii. determining Residual-bit-error-ratio using Bit-Error-Ratio and Traffic-class, if Delivery-of-erroneous-SDUs is set to –; and iii. determining both Residual-bit-error-ratio and SDU-error-ratio using Bit-Error-Ratio and Traffic-class, if Delivery-of-erroneous-SDUs is set to Yes/No; and
b. repeating step a for each RAB sub-flow if more than one.

35. The method in a network node equipment according to claim 33, wherein said step of determining SDU-error-ratio and Residual-bit-error-ratio using Packet-Loss-Ratio, if Packet-Loss-Ratio is set and Bit-Error-Ratio is not set, further comprises the steps of:
a. if the number of Radio Access Bearer (RAB) sub-flows is one, performing substeps of:
i. checking for Delivery-of-erroneous-SDUs;
ii. determining Residual-bit-error-ratio using Packet-Loss-Ratio and Traffic-class, if Delivery-of-erroneous-SDUs is set to –; and
iii. determining both Residual-bit-error-ratio and SDU-error-ratio using Packet-Loss-Ratio and Traffic-class, if Delivery-of-erroneous-SDUs is set to Yes/No; and
b. repeating step a for each RAB sub-flow if more than one.

36. The method in a network node equipment according to claim 33, wherein said step of determining SDU-error-ratio and Residual-bit-error-ratio using Packet-Loss-Ratio and Bit-Error-Ratio, if Packet-Loss-Ratio and Bit-Error-Ratio are set, further comprises the steps of:
a. if the number of Radio Access Bearer (RAB) sub-flows is one, performing substeps of:
i. checking for Delivery-of-erroneous-SDUs;
ii. determining Residual-bit-error-ratio using Bit-Error-Ratio and Traffic-class, if Delivery-of-erroneous-SDUs is set to –; and
iii. determining both Residual-bit-error-ratio and SDU-error-ratio using Bit-Error-Ratio, Packet-Loss-Ratio and Traffic-class, if Delivery-of-erroneous-SDUs is set to Yes/No; and
b. repeating step a for each RAB sub-flow if more than one.

37. The method in a network node equipment according to claim 22, wherein said step of translating UMTS QoS attributes to IP QoS parameters comprises the steps of:
a. determining Expected-Delay-Bound, Packet-Handling-Priority, Token-Rate and Peak-Rate using Traffic-class, Transfer-delay, Traffic-handling-priority, Guaranteed-bit-rate and Maximum-bit-rate;
b. determining Maximum-Packet-Size and Service Data Unit (SDU) Format Information (SFI) using Maximum-SDU-size and SDU-format-information; and
c. determining Packet-Loss-Ratio and Bit-Error-Ratio using Residual-bit-error-ratio and SDU-error-ratio.

38. The method in a network node equipment according to claim 37, wherein said step of determining Expected-Delay-Bound, Packet-Handling-Priority, Token-Rate and Peak-Rate using Traffic-class, Transfer-delay, Traffic-handling-priority, Guaranteed-bit-rate and Maximum-bit-rate, further comprises the steps of:
a. checking for Traffic-class;
b. determining Token-Rate using Guaranteed-bit-rate, if Traffic-class is Streaming or Conversational;
c. determining Peak-Rate using Maximum-bit-rate, if Traffic-class is Streaming or Conversational;
d. determining Expected-Delay-Bound using Transfer-delay, if Traffic-class is Streaming or Conversational;
e. determining Token-Rate using Maximum-bit-rate, if Traffic-class is Background or Interactive;
f. determining Peak-Rate using Maximum-bit-rate, if Traffic-class is Background or Interactive;
g. determining Packet-Handling-Priority using Traffic-handling-priority, if Traffic-class is Background or Interactive.

39. The method in a network node equipment according to claim 37, wherein said step of determining Maximum-Packet-Size and SFI using Maximum-SDU-size and SDU-format-information further comprises the steps of:
a. checking whether SDU-format-information is set;
b. determining Maximum-Packet-Size using SDU-format-information, if SDU-format-information is set;
c. determining SFI using SDU-format-information, if SDU-format-information is set; and d. determining Maximum-Packet-Size using Maximum-SDU-size, if SDU-format-information is not set.

40. The method in a network node equipment according to claim 37, wherein said step of determining Packet-Loss-Ratio and Bit-Error-Ratio using Traffic-class, Delivery-of-erroneous-SDUs, Residual-bit-error-ratio and SDU-error-ratio, further comprises the steps of:
   a. if multiple Radio Access Bearer (RAB) sub-flows and different values of SDU-error-ratio and/or Residual-bit-error-ratio are not set for the respective sub-flows, performing substeps of:
      i. checking for Delivery-of-erroneous-SDUs
      ii. determining Packet-Loss-Ratio and Bit-Error-Ratio using Residual-bit-error-ratio and Traffic-class, if Delivery-of-erroneous-SDUs is set to −; and
      iii. determining Packet-Loss-Ratio and Bit-Error-Ratio using SDU-error-ratio, Residual-bit-error-ratio and Traffic-class, if Delivery-of-erroneous-SDUs is set to Yes/No; and
   b. repeating step a for all RAB sub-flows if different values of SDU-error-ratio and/or Residual-bit-error-ratio are set for the respective sub-flows.

\* \* \* \* \*

UNITED STATES PATENT AND TRADEMARK OFFICE
CERTIFICATE OF CORRECTION

PATENT NO. : 7,206,324 B2  Page 1 of 1
APPLICATION NO. : 10/138240
DATED : April 17, 2007
INVENTOR(S) : Fredrik Persson et al.

It is certified that error appears in the above-identified patent and that said Letters Patent is hereby corrected as shown below:

In Column 14, Line 48, in Claim 20, after "parameters" delete "and" and insert -- , --, therefor.

In Column 16, Line 28, in Claim 29, delete "using Bit-Error-ratio," before "Packet-Loss-Ratio".

Signed and Sealed this

First Day of April, 2008

JON W. DUDAS
*Director of the United States Patent and Trademark Office*